(12) United States Patent
Osawa et al.

(10) Patent No.: US 10,996,196 B2
(45) Date of Patent: May 4, 2021

(54) PARTICULATE SENSOR AND METHOD FOR MANUFACTURING PARTICULATE SENSOR

(71) Applicant: NGK SPARK PLUG CO., LTD., Nagoya (JP)

(72) Inventors: Norimasa Osawa, Inuyama (JP); Masayuki Motomura, Komaki (JP); Keisuke Tashima, Kasugai (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 206 days.

(21) Appl. No.: 16/106,367

(22) Filed: Aug. 21, 2018

(65) Prior Publication Data

US 2019/0064112 A1    Feb. 28, 2019

(30) Foreign Application Priority Data

Aug. 24, 2017  (JP) .............................. JP2017-161218
Sep. 27, 2017  (JP) .............................. JP2017-187015

(51) Int. Cl.
*G01N 27/626*    (2021.01)
*G01N 27/70*    (2006.01)

(52) U.S. Cl.
CPC ........... *G01N 27/626* (2013.01); *G01N 27/70* (2013.01); *F01N 2560/05* (2013.01)

(58) Field of Classification Search
None
See application file for complete search history.

(56) References Cited

U.S. PATENT DOCUMENTS

| | | | |
|---|---|---|---|
| 2012/0312074 A1* | 12/2012 | Allmendinger | G01N 1/2252 73/23.31 |
| 2014/0352405 A1* | 12/2014 | Motomura | F01N 11/00 73/23.31 |
| 2015/0192545 A1* | 7/2015 | Sugiyama | G01N 27/70 73/28.01 |
| 2017/0045435 A1 | 2/2017 | Sugiyama et al. | |

FOREIGN PATENT DOCUMENTS

WO    2016/027894 A1    2/2016

\* cited by examiner

*Primary Examiner* — Nasima Monsur
(74) *Attorney, Agent, or Firm* — Sughrue Mion, PLLC

(57) ABSTRACT

A particulate sensor (10) to be attached to a gas flow pipe EP through which a gas to be measured EG containing particulates S flows. The particulate sensor (10) includes a gas introduction discharge pipe (31); a discharge element (60) including a discharge electrode member (62) maintained at a discharge potential DV and which electrifies particulates contained in the gas under measurement, and a sealed portion (60C) located on a proximal end side GK of an element distal end portion and in which the discharge electrode member is disposed and insulated from the outer surface (60CS) thereof; a surrounding member (38, 39) maintained at a first potential SGND; and an electrically conductive glass seal (37) which establishes electrical communication between the surrounding member and the pipe (31), and is in close contact with the outer surface of the sealed portion of the discharge element to provide gastight sealing.

15 Claims, 12 Drawing Sheets

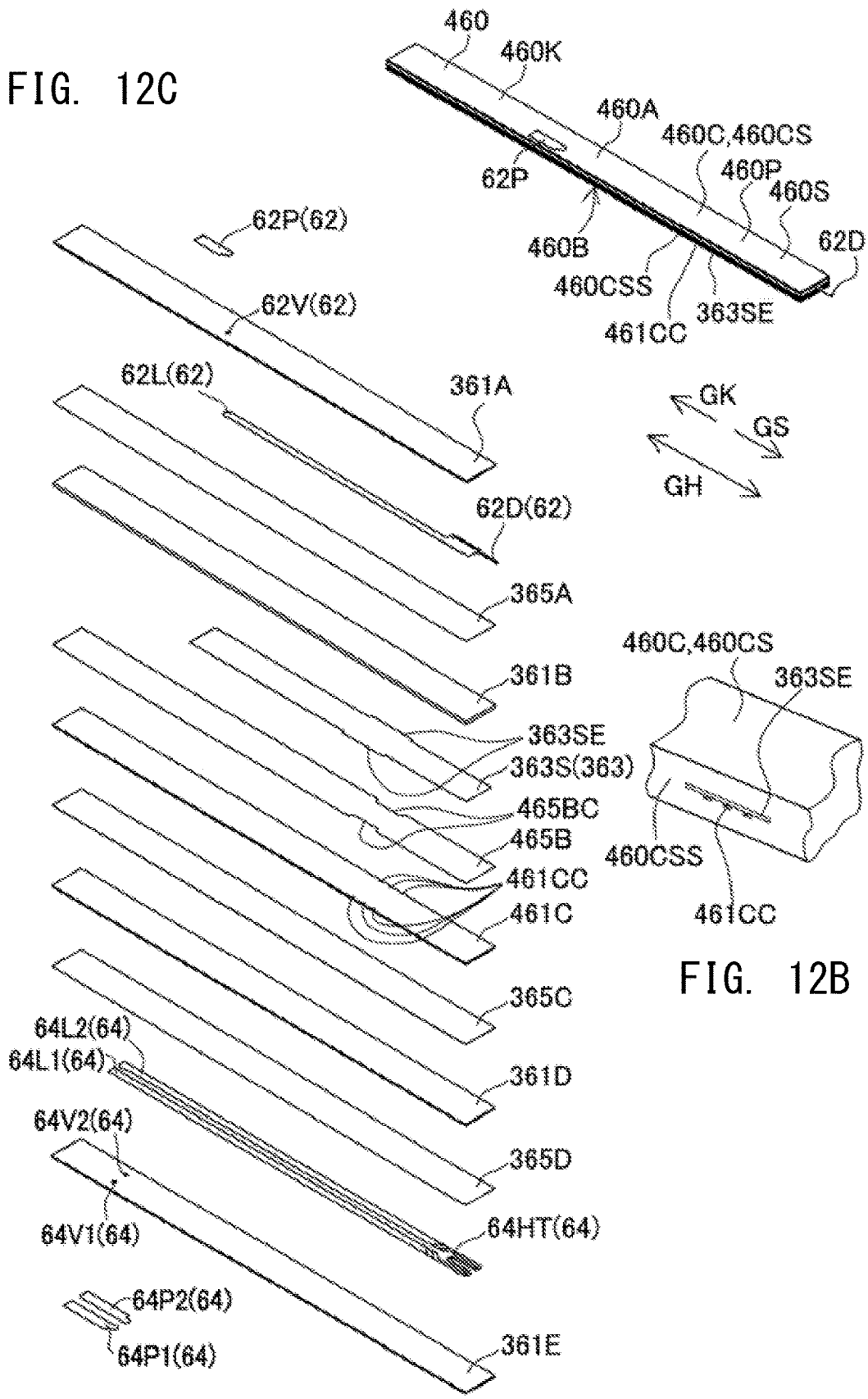

PARTICULATE SENSOR AND METHOD FOR MANUFACTURING PARTICULATE SENSOR

BACKGROUND OF THE INVENTION

1. Field of the Invention

The present invention relates to a particulate sensor which is attached to a metallic gas flow pipe through which a gas to be measured containing particulates flows, and to a method for manufacturing the particulate sensor

2. Description of the Related Art

A particulate sensor has been known which in use is attached to a gas flow pipe and which is adapted to detect the amount of particulates contained in a gas to be measured flowing through the gas flow pipe. An example of such a particulate sensor is a particulate sensor which is attached to an exhaust pipe of an internal combustion engine (a diesel engine, a gasoline engine, or the like) so as to detect the mount of particulates, such as soot, contained in exhaust gas. More specifically, the particulate sensor is configured to introduce the exhaust gas flowing through the exhaust pipe, cause ions generated by means of gaseous discharge to adhere to the particulates in the introduced gas, thereby generating electrified particulates, and discharge the electrified particulates to the exhaust pipe together with the introduced gas.

This particulate sensor includes, for example, an outer metallic member, an inner metallic member, and an insulating spacer. The outer metallic member is a tubular member which is attached to the exhaust pipe and thereby maintained at ground potential. The inner metallic member is a member which is disposed on the radially inner side of the outer metallic member, is insulated from the outer metallic member, and is maintained at a first potential different from the ground potential. The insulating spacer is a tubular member which is held between the inner metallic member and the outer metallic member, electrically insulates the inner and outer metallic members from each other, and is exposed to the exhaust gas within the exhaust pipe. Such a particulate sensor is disclosed, for example, in Patent Document 1.

[Patent Document 1] WO 2016/027894

3. Problems to be Solved by the Invention

In this particulate sensor, a discharge element which includes a discharge electrode member maintained at a discharge potential is held gastightly, while being surrounded by the inner metallic member which is maintained at the first potential to implement a Faraday cage. Specifically, a distal end portion of the discharge element is disposed in a gas introduction discharge pipe, which serves as the inner metallic member. Further, a portion of the discharge element, which portion is located on the proximal end side with respect to the distal end portion, is surrounded by a plurality of tubular metallic members electrically communicating with the gas introduction discharge pipe. Meanwhile, the discharge element is held inside these metallic members by means of an insulator formed of an insulating ceramic and a compact of an insulating powder such as talc powder. Also, a gastight seal around the discharge element is realized by the above-mentioned compact, which is in close contact with the discharge element and the metallic members.

However, a particulate sensor having such a configuration tends to be complex in structure and high in cost. This is because it requires a discharge element, an insulator and a compact which gastightly hold the discharge element, and a metallic shell which surrounds and holds these elements.

SUMMARY OF THE INVENTION

The present invention has been made to address the above problems, and an object thereof is to provide a particulate sensor which gastightly holds a discharge element using a simple structure, as well as a method for manufacturing the particulate sensor.

The above object has been achieved by providing (1) a particulate sensor which is to be attached to a metallic gas flow pipe through which a gas to be measured containing particulates flows and which gas flow pipe is maintained at ground potential, the particulate sensor detecting the particulates contained in the gas to be measured, the particulate sensor comprising: a gas introduction discharge pipe into which a gas under measurement, which is a portion of the gas to be measured, is introduced and from which the gas under measurement is then discharged; a discharge element which is formed of insulating ceramic and includes a discharge electrode member maintained at a discharge potential different from the ground potential, the discharge element having an element distal end portion which is located on a distal end side of the discharge element, which element distal end portion is disposed in the gas introduction discharge pipe, and electrifies the particulates contained in the gas under measurement by means of discharge between the discharge electrode member and the gas introduction discharge pipe, and a sealed portion which is located on a proximal end side of the element distal end portion and in which the discharge electrode member is disposed and insulated from an outer surface thereof; a surrounding member which is maintained at a first potential different from both the ground potential and the discharge potential and which surrounds an element proximal end side portion of the discharge element located on the proximal end side with respect to the sealed portion; and an electrically conductive seal which is formed of electrically conductive glass, establishes electrical communication between the surrounding member and the gas introduction discharge pipe, and is in close contact with the outer surface of the sealed portion of the discharge element so as to provide gastight sealing.

In the particulate sensor (1), the electrically conductive seal formed of electrically conductive glass surrounds the outer surface of the sealed portion of the discharge element and gastightly adheres thereto. Therefore, the discharge element is held gastightly by the electrically conductive seal at the sealed portion.

In addition, the electrically conductive seal is formed of electrically conductive glass and establishes electrical communication between the surrounding member maintained at the first potential and the gas introduction discharge pipe. Therefore, a metal block, such as a metallic shell, is not needed for establishing electrical communication between the surrounding member and the gas introduction discharge pipe so as to maintain the gas introduction discharge pipe at the first potential. Therefore, the particulate sensor can gastightly hold the discharge element therein despite its simple structure.

Notably, by configuring the sealed portion of the discharge element such that the discharge electrode member is disposed within an insulator, the discharge electrode member is prevented from being shorted to the electrically conductive seal at the sealed portion. Namely, the discharge element is configured such that the discharge electrode member does not electrically communicate with the electrically conductive seal at the sealed portion, and the discharge electrode member of the discharge element is held in a Faraday cage formed by the surrounding member, the electrically conductive seal, and the gas introduction discharge pipe, which are maintained at the first potential.

The gas introduction discharge pipe is a tubular member for introducing the gas under measurement into its internal space and discharging the introduced gas under measurement. The gas introduction discharge pipe may have a single tube structure, a double tube structure in which an inner pipe and an outer pipe are disposed coaxially, or a labyrinth structure which renders complex the path of the gas under measurement flowing through the gas introduction discharge pipe.

The gas introduction discharge pipe may be in contact with the electrically conductive seal for electrical communication therewith, or may electrically communicate indirectly with the electrically conductive seal through another metallic member.

An example of the electrically conductive glass used to form the electrically conductive seal is insulating glass including electrically conductive particles, such as metal particles, dispersed therein. An example of a method of forming the electrically conductive seal from such electrically conductive glass is a method of heating electrically conductive glass powder containing insulating glass powder and electrically conductive powder to a temperature equal to or higher than the softening point of the insulating glass powder, thereby fusion-bonding particles of the insulating glass together. Examples of the electrically conductive powder used for the electrically conductive glass include metal powders, such as copper powder, brass powder, and nickel powder, and non-metal electrically conductive powders, such as graphite powder and carbon black. Examples of the insulating glass include calcium borosilicate glass, borosilicate glass, and soda-lime glass. Also, the electrically conductive glass powder may be metal-coated glass powder made by forming a metal coating on glass particles through plating or the like.

In a preferred embodiment (2) of the above-described particulate sensor (1), the discharge element includes an element heater wiring line which is connected at one end to the ground potential and which heats the element distal end portion, and a shield electrode layer which is disposed between the element heater wiring line and the discharge electrode member so as to electromagnetically shield the element heater wiring line and the discharge electrode member from each other; and the shield electrode layer electrically communicates with the electrically conductive seal.

In the particulate sensor (2), the element distal end portion of the discharge element, which portion is exposed to the gas under measurement, is heated so as to prevent adhesion of foreign particles to the element distal end portion and remove the foreign particles from the element distal end portion. Therefore, an element heater wiring line for heating the element distal end portion is provided in the discharge element.

However, in the case where the element heater wiring line for heating the element distal end portion is provided in the discharge element, due to discharge at the discharge electrode member, an induced current flows through the element heater wiring line. Therefore, in a controller which controls the particulate sensor, the ground potential to which one end of the element heater wiring line is connected changes, and thus, noise may be superimposed on the output signal of the particulate sensor.

In order to overcome such a problem, in the particulate sensor (2), the shield electrode layer is provided between the element heater wiring line and the discharge electrode member. The shield electrode layer electrically communicates with the electrically conductive seal to thereby be maintained at the first potential, and provides an electromagnetic shield between the element heater wiring line and the discharge electrode member.

As a result, it is possible to prevent induced current from flowing through the element heater wiring line, which flow would otherwise occur due to discharge at the discharge electrode member. Thus, changes in the ground potential and resultant superimposition of noise on the output signal of the particulate sensor can be suppressed.

In addition, the shield electrode layer electrically communicates with the electrically conductive seal, whereby the shield electrode layer can be maintained at the first potential. Therefore, it is unnecessary to provide wiring within the particulate sensor so as to supply the first potential to the shield electrode layer of the discharge element, thereby maintaining the shield electrode layer at the first potential.

In another preferred embodiment (3) of the above-described particulate sensor (2), the discharge element has a shield electrode pad which is formed on the outer surface of the sealed portion and electrically communicates with the shield electrode layer; and the shield electrode layer electrically communicates with the electrically conductive seal through the shield electrode pad.

In the particulate sensor (3), since the shield electrode pad electrically communicating with the shield electrode layer is provided on the outer surface of the sealed portion, electrical communication between the shield electrode layer and the electrically conductive seal can be readily established so as to maintain the shield electrode layer at the first potential. Also, since the shield electrode layer is connected to the electrically conductive seal through the shield electrode pad having a given area, reliable electrically communication can be established between the electrically conductive seal and the shield electrode pad and thus the shield electrode layer.

In yet another preferred embodiment (4) of the above-described particulate sensor (2), the shield electrode layer has an extension portion extending to the outer surface of the discharge element; and the shield electrode layer is connected to the electrically conductive seal at the extension portion.

In the particulate sensor (4), since the shield electrode layer itself has the extension portion and is connected to the electrically conductive seal through the extension portion, it is unnecessary to provide a via or the like inside the discharge element for connection to the shield electrode layer. Therefore, the shield electrode layer can be connected to the electrically conductive seal by a simple structure.

Notably, in addition to the extension portion extending to the outer surface of the sealed portion, a shield electrode pad which is connected to the extension portion may be provided on the outer surface of the sealed portion, and the shield electrode layer may be connected to the electrically conductive seal through the shield electrode pad as well.

In yet another preferred embodiment (5), the above-described particulate sensor (1) or (2) further comprises: a tubular insulating spacer which is formed of insulating ceramic and which is disposed radially outward of a distal end side portion of the surrounding member on the distal end side, the electrically conductive seal, and a pipe proximal end side portion which is a portion of the gas introduction discharge pipe on the proximal end side; the electrically conductive seal is in gastight close contact with an inner circumferential surface of the insulating spacer; and the distal end side portion of the surrounding member and the pipe proximal end side portion of the gas introduction discharge pipe are fixed to the insulating spacer through the electrically conductive seal.

In the particulate sensor (5), since the electrically conductive seal is in gastight close contact with the inner circumferential surface of the insulating spacer, a gastight seal can be established between the proximal end side and distal end side within the insulating spacer.

In addition, the particulate sensor can have a structure in which the distal end side portion of the surrounding member and the pipe proximal end side portion of the gas introduction discharge pipe are fixed to the insulating spacer via the electrically conductive seal formed of electrically conductive glass and having a simple structure.

In yet another preferred embodiment (6) of the above-described particulate sensor (5), the insulating spacer has a stepped spacer ledge portion projecting radially inward; the pipe proximal end side portion of the gas introduction discharge pipe has a stepped pipe shoulder portion whose diameter on the distal end side is smaller than that on the proximal end side and which engages the spacer ledge portion, and a pipe proximal end portion which is located on the proximal end side of the pipe shoulder portion and has an end edge on the proximal end side; and the electrically conductive seal is in contact with the pipe proximal end portion.

In the particulate sensor (6), since the electrically conductive seal is in contact with the pipe proximal end portion of the gas introduction discharge pipe, the gas introduction discharge pipe can be reliably maintained at the first potential through the electrically conductive seal.

Notably, the electrically conductive seal may come into contact with the pipe proximal end portion of the gas introduction discharge pipe from the radially outer side or the radially inner side, or from both sides; i.e., from the radially outer side and the radially inner side.

In yet another preferred embodiment (7) of the above-described particulate sensor (6) further comprises an element holder which is formed of insulating ceramic and which has, on its outer circumferential surface, a stepped holder shoulder portion whose diameter on the distal end side is smaller than that on the proximal end side and which engages the pipe shoulder portion of the gas introduction discharge pipe, and an insertion hole through which an element insertion portion of the discharge element between the element distal end portion and the sealed portion is inserted, wherein the element holder holds the discharge element at the through hole, and butts against the electrically conductive seal from the distal end side.

In the particulate sensor (7), the holder shoulder portion of the element holder engages the pipe shoulder portion of the gas introduction discharge pipe. Since the pipe shoulder portion of the gas introduction discharge pipe engages the spacer ledge portion of the insulating spacer, the element holder is indirectly engaged with the insulating spacer. In addition, since the element holder comes into contact with the electrically conductive seal from the distal end side, it is possible to reliably prevent the electrically conductive seal from moving toward the distal end side within the insulating spacer by the element holder.

In yet another preferred embodiment (8) of the particulate sensor of any of (1) to (7) described above, the surrounding member includes an inner tube formed of metal and having the shape of a tube with a bottom, the inner tube having a closed distal end bottom portion on the distal end side and an insertion hole formed in the distal end bottom portion and through which the discharge element is inserted, the inner tube surrounding the element proximal end side portion of the discharge element from the radially outer side; and the distal end bottom portion of the inner tube contacts the electrically conductive seal from the proximal end side.

In the particulate sensor (8), since the surrounding member includes an inner tube including a distal end bottom portion, a Faraday cage can be formed by surrounding the element proximal end side portion of the discharge element from the radially outer side by the inner tube. In addition, since the distal end bottom portion of the inner tube is in contact with the electrically conductive seal, electrical communication can be appropriately established between the inner tube and the electrically conductive seal, whereby the electrically conductive seal can be maintained at the first potential.

In a second aspect (9) for solving the above-described problems, the present invention provides a method of manufacturing a particulate sensor which is to be attached to a metallic gas flow pipe through which a gas to be measured containing particulates flows and which gas flow pipe is maintained at ground potential, the particulate sensor detecting the particulates contained in the gas to be measured, the particulate sensor comprising: a gas introduction discharge pipe into which a gas under measurement, which is a portion of the gas to be measured, is introduced, and from which the gas under measurement is then discharged; a discharge element which is formed of insulating ceramic and includes a discharge electrode member maintained at a discharge potential different from the ground potential, the discharge element having an element distal end portion which is located on a distal end side of the discharge element, is disposed in the gas introduction discharge pipe, and electrifies the particulates contained in the gas under measurement by means of discharge between the discharge electrode member and the gas introduction discharge pipe, and a sealed portion which is located on a proximal end side of the element distal end portion and in which the discharge electrode member is disposed and insulated from an outer surface thereof; a surrounding member which is maintained at a first potential different from both the ground potential and the discharge potential and which surrounds an element proximal end side portion of the discharge element located on the proximal end side with respect to the sealed portion; and an electrically conductive seal which is formed of electrically conductive glass, establishes electrical communication between the surrounding member and the gas introduction discharge pipe, and is in close contact with the outer surface of the sealed portion of the discharge element so as to provide gastight sealing. The method comprises a seal forming step of bringing softened electrically conductive glass into close contact with outer surfaces of the surrounding member, the gas introduction discharge pipe, and the sealed portion of the discharge element to thereby form the electrically conductive seal.

According to the manufacturing method (9), a particulate sensor can be formed in which the electrically conductive seal electrically communicates with the surrounding member and the gas introduction discharge pipe without fail, and the electrically conductive seal is in close contact with the sealed portion of the discharge element.

BRIEF DESCRIPTION OF THE DRAWINGS

FIGS. 12A to 12C are views of the particulate sensor of the third modification, wherein the section of FIG. 12A is a perspective view showing the form of the discharge element, the section of FIG. 12B is an enlarged partial perspective view showing the form of the discharge element in the vicinity of a sealed portion thereof, and the section of FIG. 12C is an exploded perspective view showing the structure of the discharge element.

DESCRIPTION OF REFERENCE NUMERALS

Figure 1:
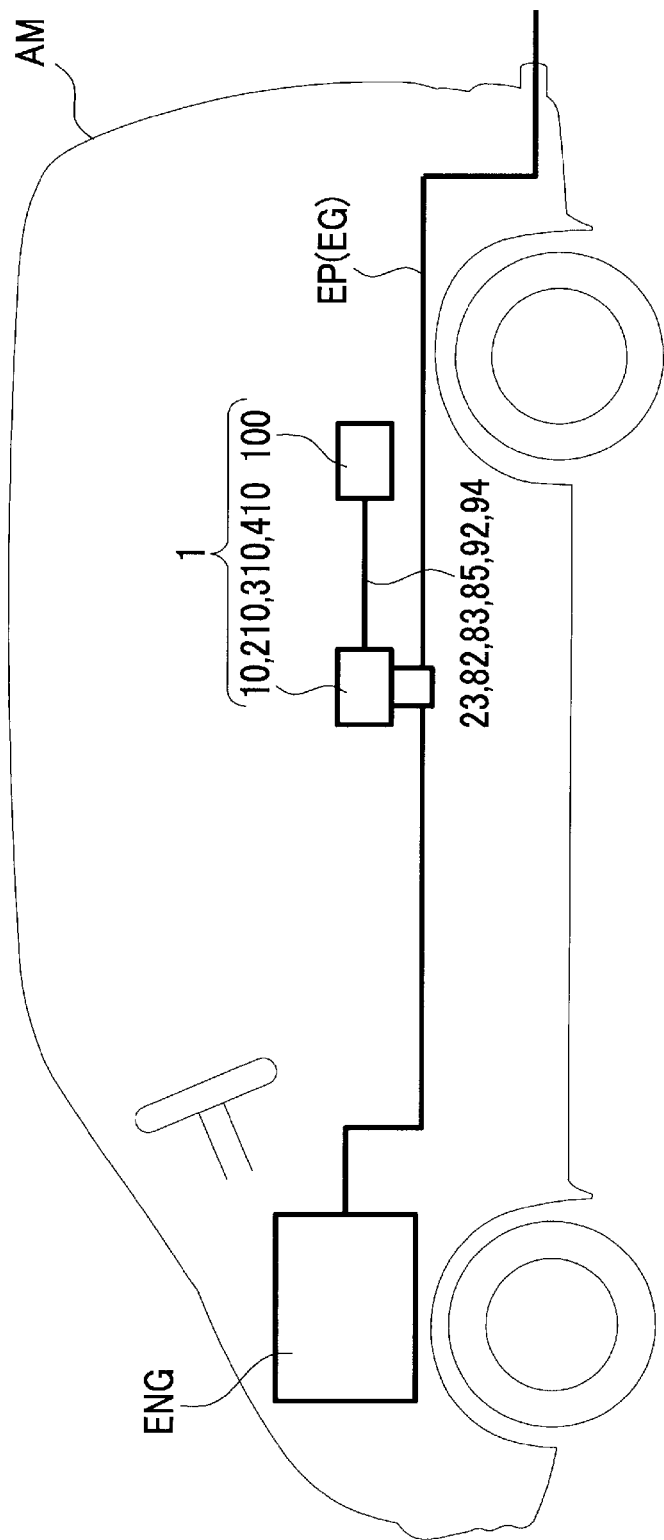
FIG. 1 is an explanatory view relating to an embodiment and first through third modifications and illustrating a state in which a particulate sensor is applied to an exhaust pipe of an engine mounted on a vehicle.

Reference numerals used to identify various features in the drawings include the following.
1: particulate detection system
10, 210, 310, 410: particulate sensor
30: sensor ground member
31: protector (gas introduction discharge pipe)
31K: pipe proximal end side portion (of the protector)
31KD: pipe shoulder portion (of the protector)
31KK: pipe proximal end portion (of the protector)
31KF proximal end edge (of the protector) (end edge on the proximal end side)
37, 237: electrically conductive seal
237A: first electrically conductive seal
237B: second electrically conductive seal
38: second inner tube (surrounding member, inner tube)
38S: distal end side portion (of the second inner tube)
38SS: distal end bottom portion (of the second inner tube)
38SH: insertion hole (of the distal end bottom portion of the second inner tube)
39: first inner tube (surrounding member)
39C: cable connection portion (of the first inner tube)
41: insulating spacer
41I inner circumferential surface (of the insulating spacer)
41D: ledge portion (of the insulating spacer)
41HT: spacer heater layer
60, 260, 360, 460: discharge element
60S, 260S, 360S, 460S: element distal end portion (of the discharge element)
60P, 260P, 360P, 460P: element insertion portion (of the discharge element)
60C, 260C, 360C, 460C: sealed portion (of the discharge element)
60CS, 260CS, 360CS, 460CS: outer surface (of the sealed portion)
360CSS, 460CSS: side portion (of the outer surface of the sealed portion)
60K, 260K, 360K, 460K: element proximal end side portion (of the discharge element)
461CC: recess (of the ceramic layer)
62: discharge electrode member
62L: discharge wiring trace
62D: needle-shaped electrode portion
63, 263, 363: shield electrode portion
63S, 263S, 363S: shield electrode layer
363SE: extension portion (of the shield electrode layer)
63P1, 63P2, 63P3, 263P1, 263P2, 263P3: shield electrode pad
64, 264: element heater wiring line
64P1, 64P2, 264P1, 264P2, 264P3, 264P4: element heater pad
64HT, 264HT: element heater portion
71: element holder
71R: outer circumferential surface (of the element holder)
71D: holder shoulder portion (of the element holder)
71H: insertion hole (of the element holder)
82: discharge potential cable
82L: discharge potential lead wire
82D: outer conductor
84, 86: element heater lead wire
92, 94: spacer heater lead wire
AM: vehicle
ENG: engine
EP: exhaust pipe (gas flow pipe)
EG: exhaust gas (gas to be measured)
SG: gas under measurement
CGND: chassis ground potential (ground potential)
SGND: sensor ground potential (first potential)
DV: discharge potential
Is: signal current
100: controller
110: ion source power supply circuit 130: isolation transformer
140: signal current detection circuit
150: element heater control circuit
160: spacer heater control circuit
S: particulate
SC: electrified particulate
CP: ion
CPF: floating ion
CPH: discharged ion
GH: axial direction
GS: distal end side (axial direction distal end side)
GK: proximal end side (axial direction proximal end side)
DO: radially outer side
DI: radially inner side 1 gas sensor element

DETAILED DESCRIPTION OF THE PREFERRED EMBODIMENTS

Embodiment

A particulate sensor 10 and a particulate detection system 1 according to the present embodiment will now be described with reference to the drawings. However, the present invention should not be construed as being limited thereto.

Figure 2:
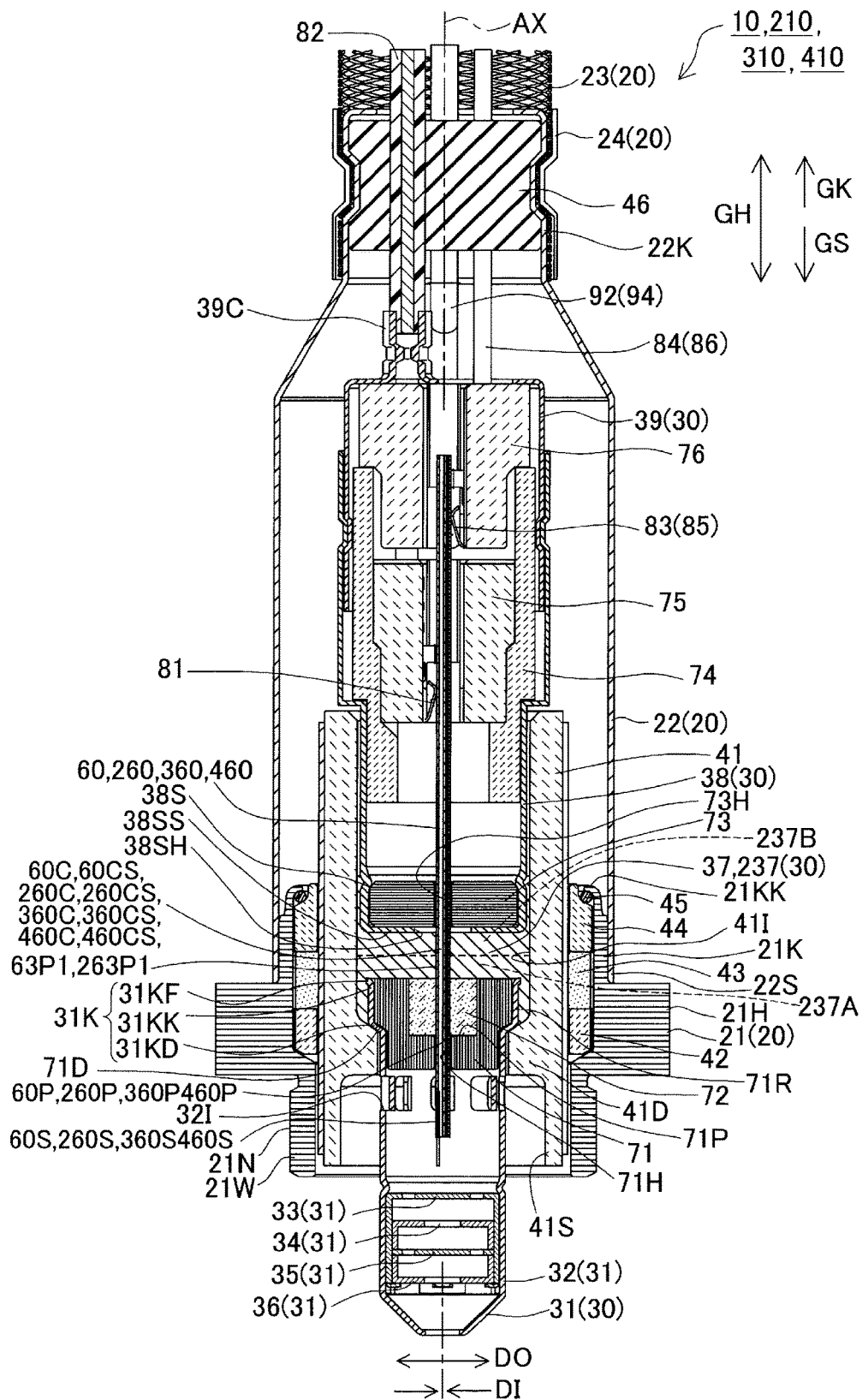
FIG. 2 is a longitudinal sectional view of the particulate sensor of the embodiment and the first through third modifications.
Figure 3:
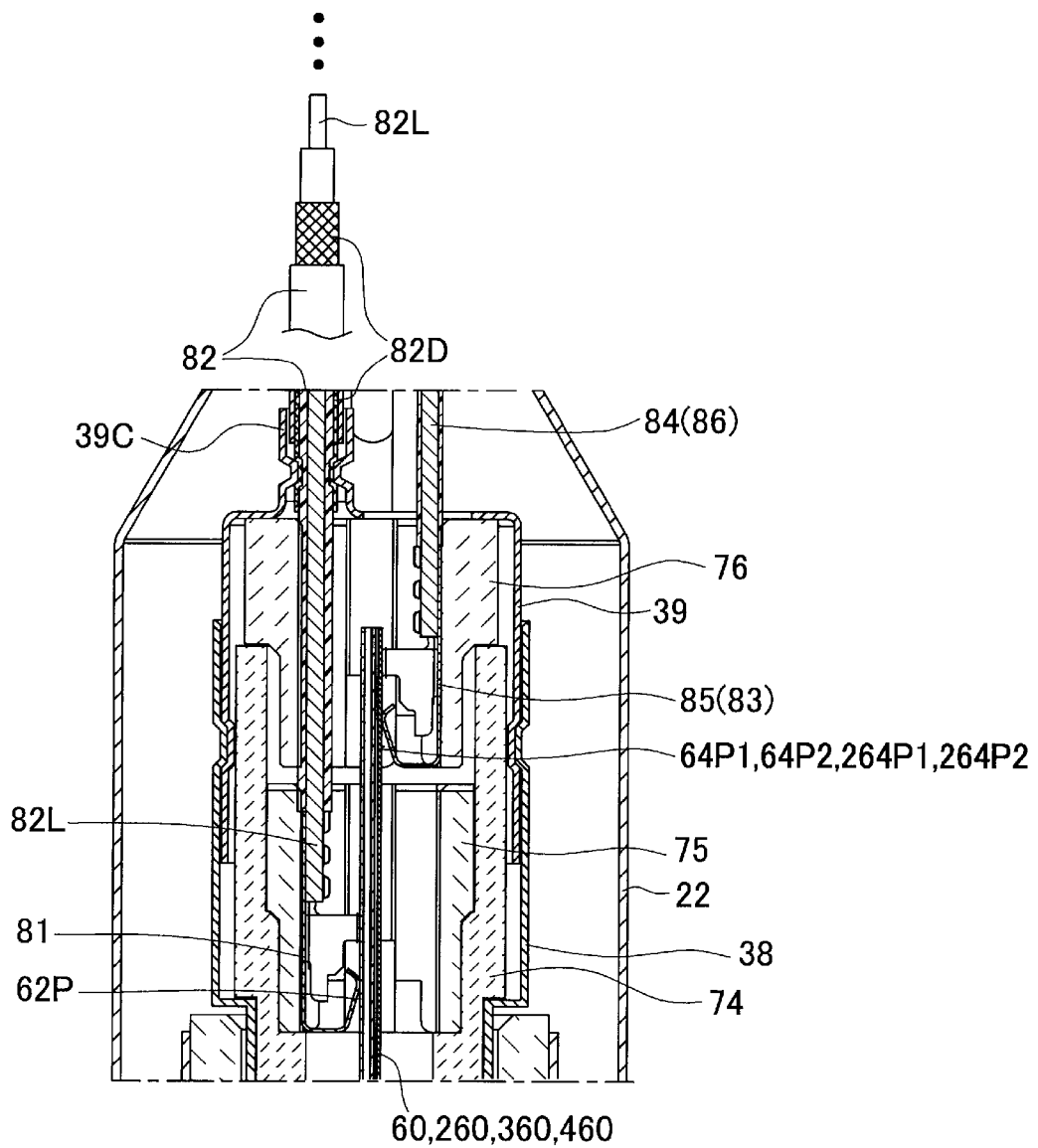
FIG. 3 is a longitudinal sectional view of the particulate sensor of the embodiment and the first through third modifications, the longitudinal sectional view being taken along a longitudinal section parallel to the longitudinal section shown in FIG. 2 and illustrating, in an enlarged scale, the connection of a discharge element within a separator.
Figure 4:
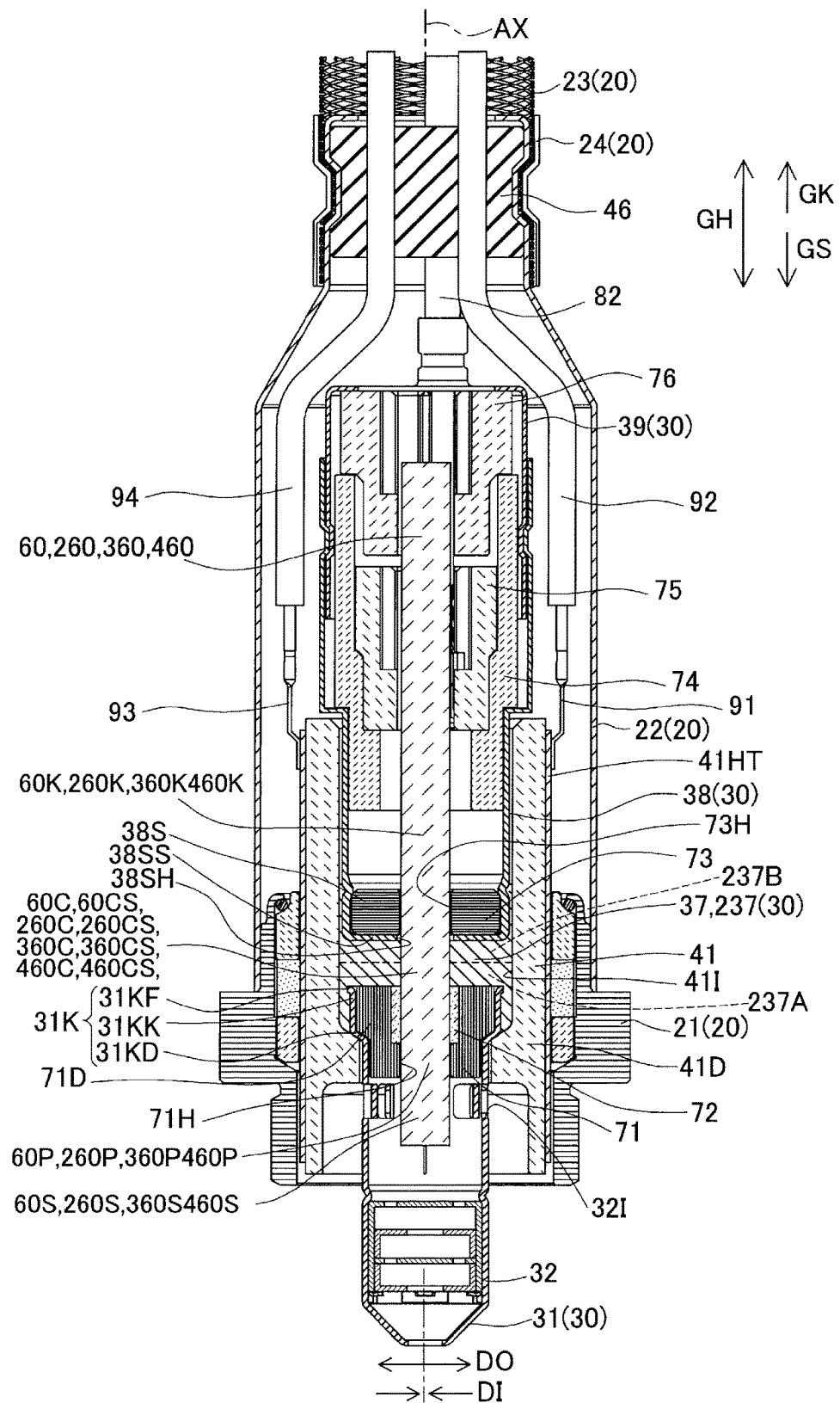
FIG. 4 is a longitudinal sectional view of the particulate sensor of the embodiment and the first through third modifications, the longitudinal sectional view being taken along a longitudinal section perpendicularly intersecting the longitudinal section shown in FIG. 2.
Figure 5:
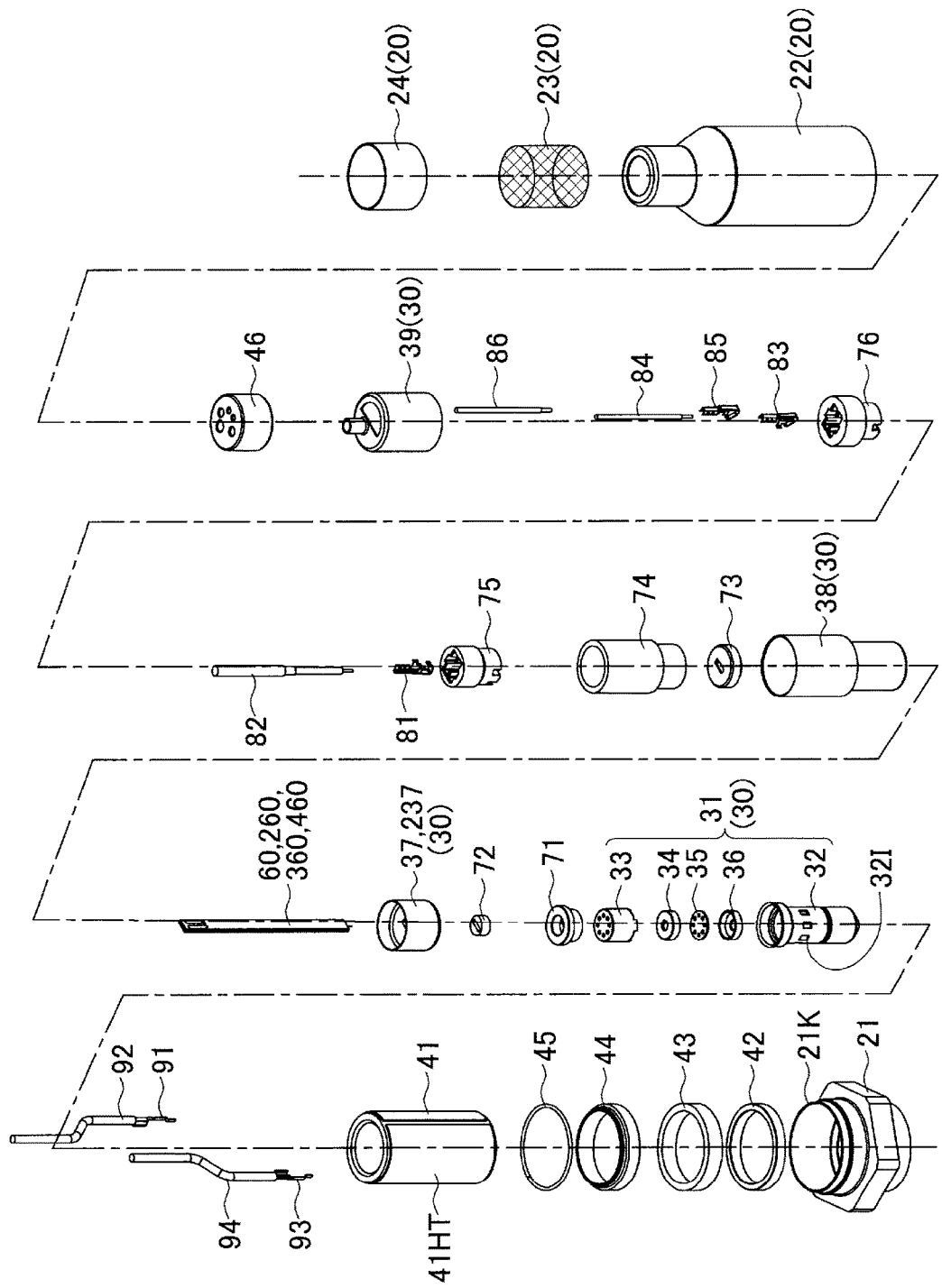
FIG. 5 is an exploded perspective view showing the structure of the particulate sensor of the embodiment and the first through third modifications.
Figure 7:
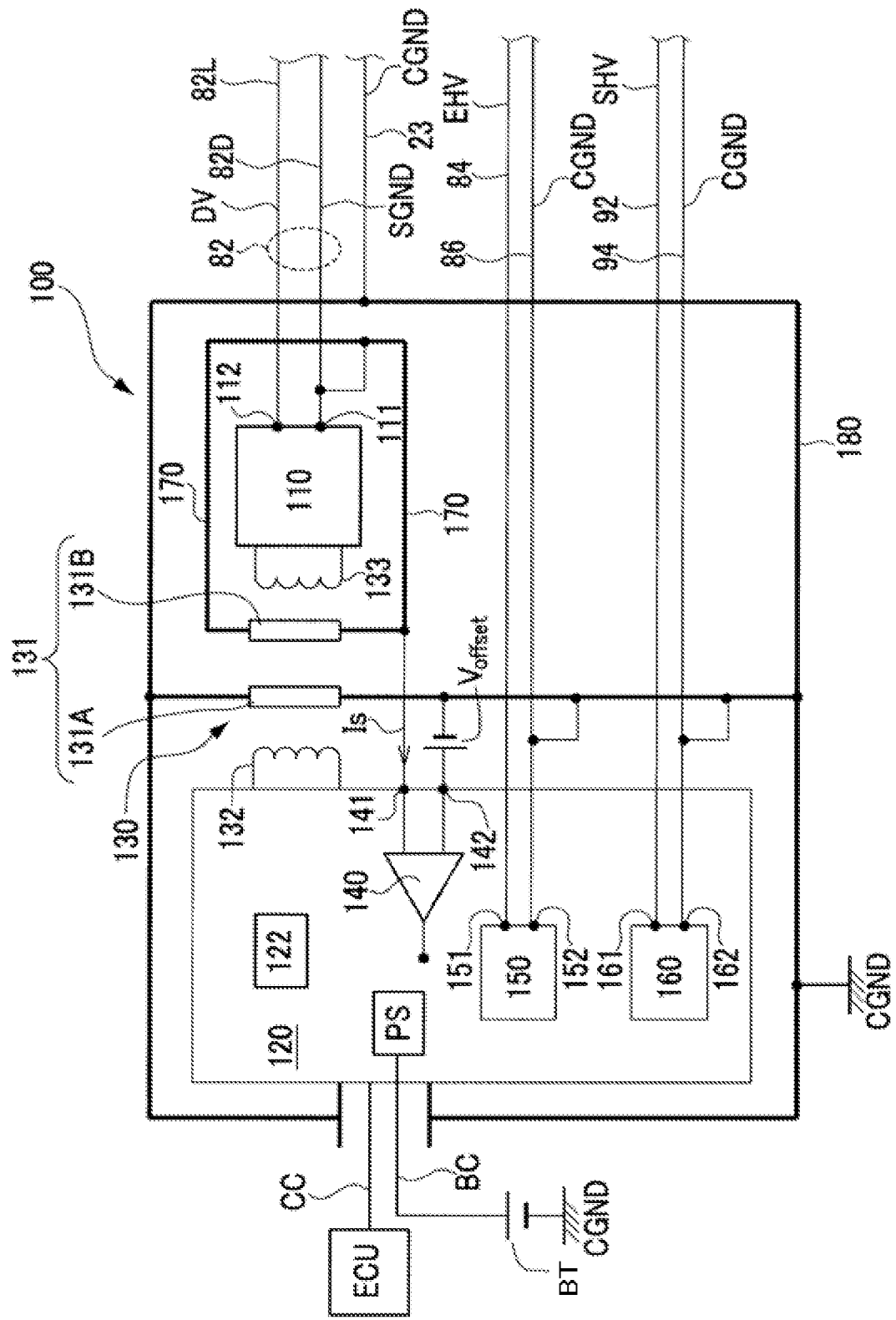
FIG. 7 is an explanatory view showing the circuit configuration of a particulate detection system for use in conjunction with the particulate sensor.
Figure 8:
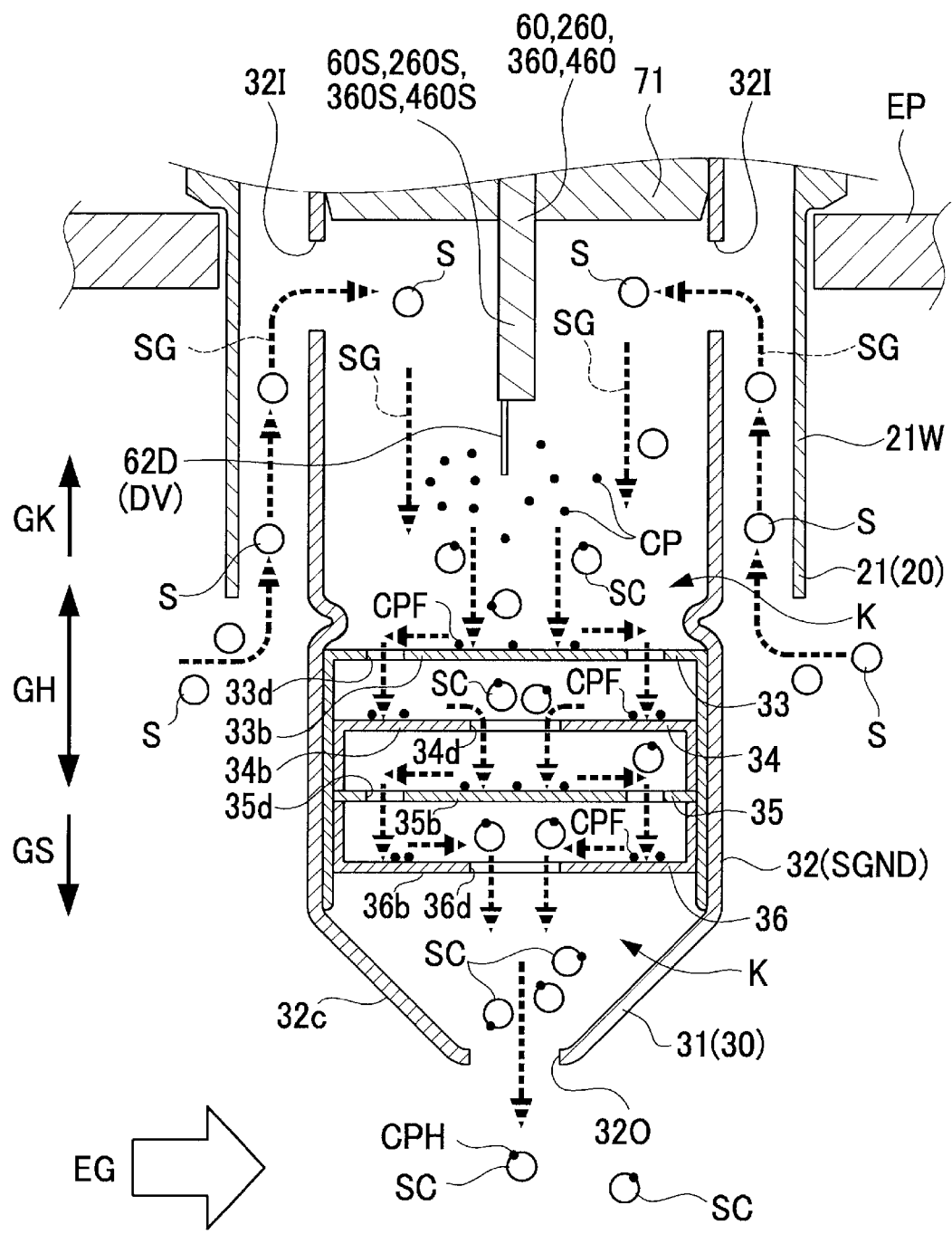
FIG. 8 is an explanatory view schematically illustrating the introduction and discharge of exhaust gas in the particulate sensor of the embodiment and the first through third modifications.
Figure 9:
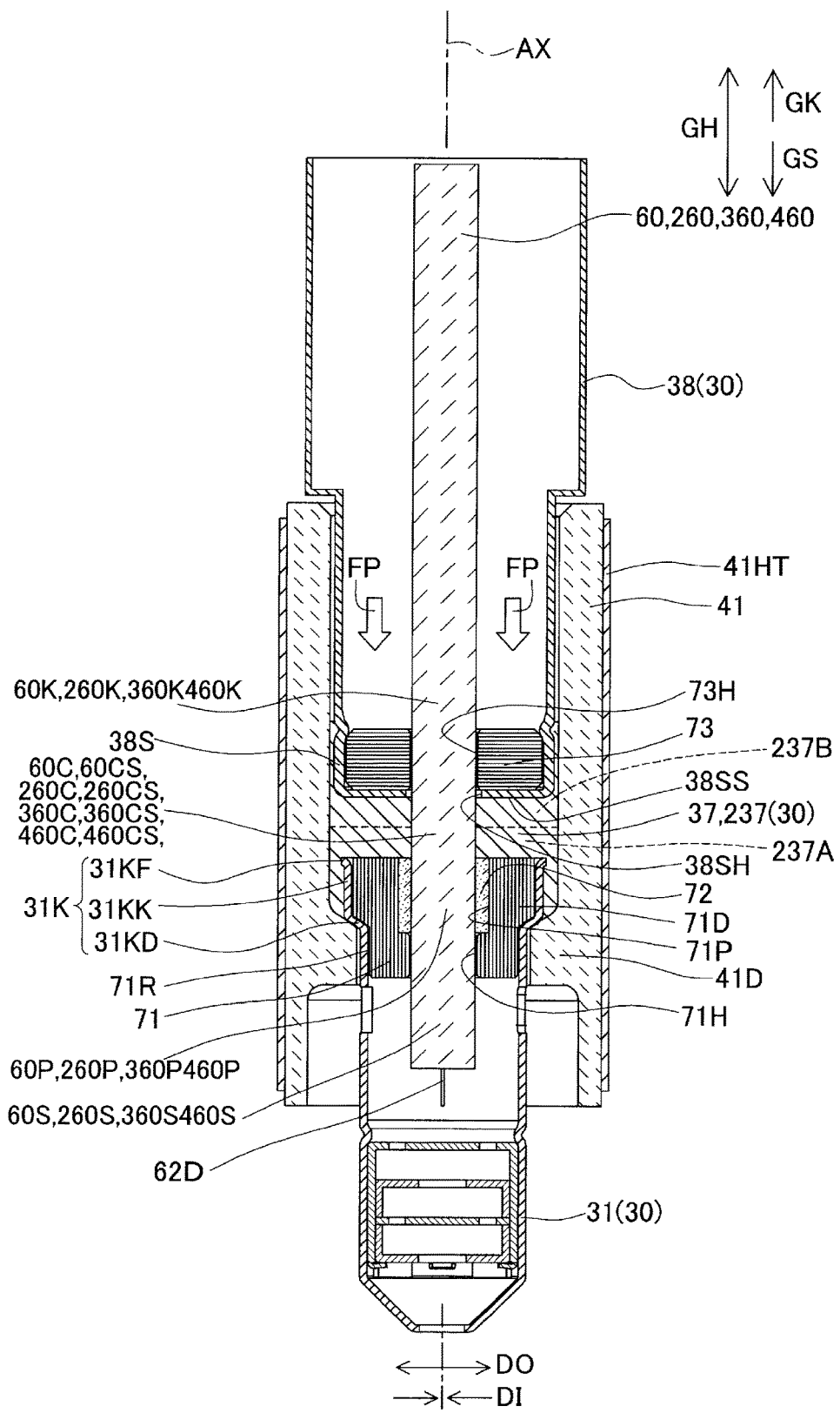
FIG. 9 is an explanatory view describing a seal forming step of a method of manufacturing the particulate sensor of the embodiment and the first through third modifications.

FIG. 1 is an explanatory view showing a state in which the particulate sensor 10 is applied to an exhaust pipe EP of an engine ENG mounted on a vehicle AM. FIG. 2 is a longitudinal sectional view of the particulate sensor 10 according to the embodiment. FIG. 3 is a longitudinal sectional view of the particulate sensor 10, the longitudinal sectional view being taken along a longitudinal section parallel to the longitudinal section shown in FIG. 2 and showing, in an enlarged scale, the connection between a discharge element 60 and a discharge potential cable 82 and element heater lead wires 84 and 86 within separators 75 and 76. FIG. 4 is a longitudinal sectional view obtained by cutting the particulate sensor 10 at a position shifted by 90° about an axial line AX from the position of the longitudinal section shown in FIG. 2. FIG. 5 is an exploded perspective view of the particulate sensor 10. FIG. 6 shows a perspective view and an exploded perspective view of the discharge element 60 of the particulate sensor 10. FIG. 7 is an explanatory view showing the circuit configuration of a controller 100 used in the particulate detection system 1. FIG. 8 is an explanatory view schematically showing the introduction and discharge of exhaust gas EG in the particulate sensor 10. FIG. 9 is an explanatory view describing a seal forming step of a method of manufacturing the particulate sensor 10.

In the present specification, as shown in FIG. 2, etc., with respect to an axial direction GH along the axial line AX of the particulate sensor 10 (the direction in which the axial line AX extends; i.e., the vertical direction in FIG. 2), the side (the lower side in FIG. 2) where a protector 31 (a gas introduction discharge pipe) is disposed will be referred to as the distal end side GS, and the side (the upper side in FIG. 2) opposite thereto will be referred to as the proximal end side GK. A radial direction away from the axial line AX (an outward side in the horizontal direction in FIG. 2) will be referred to as the radially outer side DO, and a radial direction toward the axial line AX (an inward side in the horizontal direction in FIG. 2) will be referred to as the radially inner side DI.

As shown in FIG. 1, the particulate detection system 1 of the present embodiment (hereinafter, also referred to as the "system 1") includes the particulate sensor 10 and the controller 100 for controlling the particulate sensor 10. The particulate sensor 10 is attached to the exhaust pipe EP (gas flow pipe) of the engine ENG (internal combustion engine) mounted on the vehicle AM, and detects particulates S, such as soot, contained in exhaust gas EG (gas to be measured) flowing through the exhaust pipe EP. Specifically, the particulate sensor 10 is fixed to the exhaust pipe EP, which is formed of metal, such that a portion of the particulate sensor 10 on the distal end side GS is disposed inside the exhaust pipe EP and is exposed to the exhaust gas EG (see FIG. 8).

The controller 100 is connected to the particulate sensor 10 through the discharge potential cable 82, the element heater lead wires 84 and 86, and spacer heater lead wires 92 and 94 (see FIGS. 1 to 4 and FIG. 7). The discharge potential cable 82 is a coaxial cable. The core wire (center conductor) of the coaxial cable is used as a discharge potential lead wire 82L and is maintained at a discharge potential DV (see FIG. 7). Meanwhile, each of the element heater lead wires 84 and 86 and the spacer heater lead wires 92 and 94 is an insulation covered single-core wire having a small diameter. The discharge potential cable 82 is surrounded by a braided tube 23 which is formed by braiding metal thin wires into a tubular shape and which is maintained at a chassis ground potential CGND.

As shown in FIG. 7, the controller 100 includes an ion source power supply circuit 110 and a measurement control circuit 120 as main circuits. The ion source power supply circuit 110 has a first output terminal 111 maintained at a sensor ground potential SGND and a second output terminal 112 maintained at the discharge potential DV. The second output terminal 112 is connected to the discharge potential lead wire 82L, which is the core wire of the discharge potential cable 82. The discharge potential DV is a positive high potential (for example, 1 to 2 kV0–p), produced through half-wave rectification, with respect to the sensor ground potential SGND serving as a reference. The ion source power supply circuit 110 constitutes a constant current power source in which the magnitude of its output current is feedback controlled such that the effective value of the output current becomes equal to a predetermined current value (for example, 5 μA). This ion source power supply circuit 110 generates the discharge potential DV which is applied to a discharge electrode member 62 of the discharge element 60 described below (see FIGS. 2 and 6).

The measurement control circuit 120 includes a signal current detection circuit 140, an element heater control circuit 150, and a spacer heater control circuit 160. The signal current detection circuit 140 has a first input terminal 141 maintained at the sensor ground potential SGND and a second input terminal 142. The signal current detection circuit 140 detects a signal current Is flowing between the first input terminal 141 and the second input terminal 142. Notably, the sensor ground potential SGND is set so as to be higher than the chassis ground potential CGND (ground potential) by an offset voltage Voffset (specifically, 0.5 V).

The element heater control circuit 150 is a circuit for controlling, through PWM (Pulse-Width-Modulation) control, the supply of electric current to an element heater wiring line 64 contained in the discharge element 60, described below (see FIG. 6). The element heater control circuit 150 has a first output terminal 151 connected to the element heater lead wire 84 and a second output terminal 152 connected to the element heater lead wire 86. Notably, the second output terminal 152 and the element heater lead wire 86 electrically communicate with a line maintained at the chassis ground potential CGND. Also, the first output terminal 151 and the element heater lead wire 84 are maintained at an element heater potential EHV.

The spacer heater control circuit 160 is a circuit for controlling, through PWM control, the supply of electric current to a spacer heater layer 41HT of an insulating spacer 41, which will be described later (see FIG. 4). This spacer heater control circuit 160 has a first output terminal 161 connected to the spacer heater lead wire 92 and a second output terminal 162 connected to the spacer heater lead wire 94. Notably, the second output terminal 162 and the spacer heater lead wire 94 electrically communicate with the line maintained at the chassis ground potential CGND. Also, the first output terminal 161 and the spacer heater lead wire 92 are maintained at a spacer heater potential SHV.

The ion source power supply circuit 110 is surrounded by an inner circuit case 170 maintained at the sensor ground potential SGND. The first output terminal 111 of the ion source power supply circuit 110, the first input terminal 141 of the signal current detection circuit 140, and a secondary-side core 131B of an isolation transformer 130 electrically communicate with the inner circuit case 170.

Notably, the first output terminal 111 of the ion source power supply circuit 110 electrically communicates with an outer conductor 82D of the discharge potential cable 82.

The isolation transformer 130 is a transformer whose primary and secondary sides are isolated from each other, and its core 131 is divided into a primary-side core 131A around which a primary coil 132 is wound and the above-mentioned secondary-side core 131B around which a secondary coil 133 is wound. The primary-side core 131A electrically communicates with the chassis ground potential CGND. Meanwhile, the secondary-side core 131B electrically communicates with the sensor ground potential SGND (the first output terminal 111 of the ion source power supply circuit 110) as described above.

The measurement control circuit 120 (which includes the signal current detection circuit 140, the element heater control circuit 150, and the spacer heater control circuit 160), the ion source power supply circuit 110, the inner circuit case 170, and the isolation transformer 130 are surrounded by an outer circuit case 180 maintained at the chassis ground potential CGND. The second input terminal 142 of the signal current detection circuit 140, the second output terminal 152 of the element heater control circuit 150, the second output terminal 162 of the spacer heater control circuit 160, and the primary-side core 131A of the isolation transformer 130 are connected to the outer circuit case 180 and thus are maintained at the chassis ground potential CGND. The outer circuit case 180 electrically communicates with the braided tube 23, which surrounds the discharge potential cable 82.

The measurement control circuit 120 includes a regulator power supply PS for supplying a predetermined DC voltage. This regulator power supply PS is connected, through power supply wiring BC, to an external battery BT mounted on the vehicle AM and is driven by the battery BT. One end of the battery BT is connected to the chassis ground (the chassis ground potential CGND). The measurement control circuit 120 includes a microprocessor 122 and can communicate, through a communication line CC, with an electronic control unit ECU for controlling the engine ENG. Thus, the measurement control circuit 120 can send a signal to the electronic control unit ECU. The signal represents, for example, the result of measurement by the above-mentioned signal current detection circuit 140 (the magnitude of the signal current Is).

A portion of electrical power input from the external battery BT to the measurement control circuit 120 through the regulator power supply PS is distributed to the ion source power supply circuit 110 through the isolation transformer 130. Notably, in the isolation transformer 130, the primary coil 132, which constitutes a portion of the measurement control circuit 120, the secondary coil 133, which constitutes a portion of the ion source power supply circuit 110, and the core 131 (the primary-side core 131A and the secondary-side core 131B) are electrically isolated or insulated from one another. Therefore, the isolation transformer 130 can maintain the electrical insulation among the coils and the core, while allowing the distribution of electric power from the measurement control circuit 120 to the ion source power supply circuit 110.

Next, the particulate sensor 10 of the present embodiment will be described with reference to FIGS. 2 to 6.

As shown in FIGS. 2 to 4, the particulate sensor 10 has the shape of a straight rod extending in the axial direction GH. As described below, the particulate sensor 10 includes the discharge element 60 which generates ions CP through gaseous discharge (specifically, corona discharge) between the protector 31 and a needle-shaped electrode portion 62D projecting from an element distal end portion 60S of the discharge element 60. In addition to the discharge element 60, the particulate sensor 10 includes sensor ground members 30 which hold the discharge element 60, while maintaining the electrical insulation between the sensor ground members 30 and the discharge element 60, and surround the discharge element 60 by a conductor maintained at the sensor ground potential SGND, thereby implementing a Faraday cage. Furthermore, the particulate sensor 10 includes chassis ground members 20 which surround and hold the sensor ground members 30, while maintaining the electrical insulation between the chassis ground members 20 and the sensor ground members 30. The chassis ground members 20 are attached to the exhaust pipe EP to thereby be maintained at the chassis ground potential CGND different from the sensor ground potential SGND.

In the present embodiment, the sensor ground members 30 include the protector 31, an electrically conductive seal 37, a second inner tube 38, and a first inner tube 39, described below. The chassis ground members 20 include a metallic mounting member 21, an outer tube 22, a braided tube 23, and a braided tube holding metallic member 24, described below.

Specifically, the particulate sensor 10 includes the metallic mounting member 21 which has a tubular shape and is disposed at an end of the particulate sensor 10 on the distal end side GS. This metallic mounting member 21 has a tool engagement portion 21H which bulges toward the radially outer side and has a hexagonal outer shape. Also, the metallic mounting member 21 has a tubular wall portion 21W located on the distal end side GS of the tool engagement portion 21H. The tubular wall portion 21W surrounds the outer circumference of the protector 31 (gas introduction discharge pipe), described below. A male screw 21N for fixing the particulate sensor 10 to the exhaust pipe EP is formed on the outer circumference of the tubular wall portion 21W. Accordingly, by using the male screw 21N of the metallic mounting member 21, the particulate sensor 10 is fixed to the exhaust pipe EP via a metallic mounting boss (not shown) separately disposed on the exhaust pipe EP. Therefore, the metallic mounting member 21 is maintained at the chassis ground potential CGND, which is the same as the potential of the exhaust pipe EP.

An outer tube 22 formed of metal is fixed to an end of the metallic mounting member 21 on the proximal end side GK. Specifically, a distal end portion 22S of the outer tube 22 is externally fitted to a proximal end portion 21K of the metallic mounting member 21 and is laser-welded thereto, whereby the metallic mounting member 21 and the outer tube 22 are united.

A proximal end portion 22K of the outer tube 22 on the proximal end side GK has a diameter smaller than that of the distal end portion 22S. A grommet 46 formed of insulating rubber is fitted into the proximal end portion 22K, and the outer circumference of the proximal end portion 22K is covered with the braided tube holding metallic member 24, which has a tubular shape, with the braided tube 23 formed of metal wires intervening therebetween. The braided tube holding metallic member 24 is crimped, so that the grommet 46, the braided tube 23, and the braided tube holding metallic member 24 are held at the proximal end portion 22K of the outer tube 22.

Therefore, as a result of attaching the metallic mounting member 21 of the particulate sensor 10 to the exhaust pipe EP, in addition to the metallic mounting member 21, the outer tube 22, the braided tube 23, and the braided tube holding metallic member 24, which electrically communicate with the metallic mounting member 21, are maintained at the chassis ground potential CGND.

Notably, the discharge potential cable 82, the element heater lead wires 84 and 86, and the spacer heater lead wires 92 and 94 extend through the grommet 46.

On the radially inner side DI of the metallic mounting member 21, a cylindrical insulating spacer 41 formed of insulating ceramic is held via an insulating holder 42 formed of insulating ceramic, a talc compact 43, an insulating sleeve 44 formed of insulating ceramic, and a wire packing 45. Notably, the insulating holder 42, the talc compact 43, the insulating sleeve 44, and the wire packing 45 are pressed in the axial direction GH by crimping a proximal end 21KK of the metallic mounting member 21; specifically, bending the proximal end 21KK toward the radially inner side DI.

In addition to the insulating spacer 41, a first cylindrical inner tube 39 and a second cylindrical inner tube 38 are disposed on the radially inner side DI of the outer tube 22. The first and second inner tubes 39 and 38 surround an element proximal end side portion 60K of the discharge element 60 on the proximal end side GK.

Although not described in detail, the insulating spacer 41 is a heater-incorporated insulating spacer which has a spacer heater layer 41HT formed on the outer circumferential surface thereof. The temperature of a distal end portion 41S of the insulating spacer 41 can be increased by energizing the spacer heater layer 41HT.

The discharge element 60 is held inside the insulating spacer 41 via the protector 31, the electrically conductive seal 37, the second inner tube 38, an element holder 71, etc.

The discharge element 60 is a multi-layer wiring board which is formed of insulating ceramic and has the discharge electrode member 62 which is maintained at the discharge potential DV different from the sensor ground potential SGND and the chassis ground potential CGND. This discharge element 60 has the element distal end portion 60S, which is located on the distal end side GS and is disposed in the protector 31. The element distal end portion 60S generates ions CP through discharge between the discharge electrode member 62 (specifically, its needle-shaped electrode portion 62D) and the protector 31 and electrifies the particulate S contained in the gas under measurement SG. In addition, the discharge element 60 has a sealed portion 60C which is located on the proximal end side GK of the element distal end portion 60S, in which the discharge electrode member 62 (specifically, its discharge wiring trace 62L) is disposed and is insulated from an outer surface 60CS (see FIGS. 2, 4, and 6).

The protector 31 not only has a function of protecting the element distal end portion 60S of the discharge element 60 from water droplets and foreign substances, but also has a function of introducing the gas under measurement SG into a space around the element distal end portion 60S of the discharge element 60. The gas under measurement SG is a portion of the exhaust gas EG flowing through the exhaust pipe EP. The protector 31, which is a metallic tubular member, is disposed at the end of the particulate sensor 10 on the distal end side GS so as to introduce the gas under measurement SG into its internal space K through gas introduction openings 32I and then discharge the gas under measurement SG through a gas discharge opening 32O. The protector 31 has a taper portion 32c on the distal end side GS which is tapered such that its diameter decreases toward the distal end side GS.

Since a cable connection portion 39C of the first inner tube 39 is connected to the outer conductor 82D, the first and second inner tubes 39 and 38 are maintained at the sensor ground potential SGND. The first and second inner tubes 39 and 38 surround the element proximal end side portion 60K of the discharge element 60, which portion is located on the proximal end side GK of the sealed portion 60C.

The electrically conductive seal 37, which is formed of electrically conductive glass, is in contact with and electrically communicates with the second inner tube 38 and the protector 31. The electrically conductive seal 37 is also in close contact with the outer surface 60CS of the sealed portion 60C of the discharge element 60 so as to gastightly seal the discharge element 60.

As described above, in this particulate sensor 10, the electrically conductive seal 37 formed of electrically conductive glass surrounds the outer surface 60CS of the sealed portion 60C of the discharge element 60 and is in gastight close contact with the outer surface 60CS. Therefore, the discharge element 60 is held gastightly by the electrically conductive seal 37 at the sealed portion 60C.

In addition, the electrically conductive seal 37 is formed of electrically conductive glass and establishes electrical communication between the protector 31 and the second inner tube 38 maintained at the sensor ground potential SGND through the first inner tube 39. Therefore, a metal block, such as a metallic shell, is not needed for establishing electrical communication between the protector 31 and the first inner tube 39 or the second inner tube 38 so as to maintain the protector 31 at the sensor ground potential SGND. Therefore, the particulate sensor 10 can gastightly hold the discharge element 60 therein despite its simple structure.

Next, the relation between the insulating spacer 41 and the electrically conductive seal 37 will be described. The electrically conductive seal 37 formed of electrically conductive glass is in gastight close contact with a cylindrical inner circumferential surface 41I of the insulating spacer 41. Through this electrically conductive seal 37, a distal end side portion 38S of the second inner tube 38 and a portion of the protector 31 located on the proximal end side GK, which portion will be referred to as a pipe proximal end side portion 31K, are fixed to the insulating spacer 41.

As described above, in the particulate sensor 10, gastight close contact is also established between the inner circumferential surface 41I of the insulating spacer 41 and the electrically conductive seal 37. Therefore, along with the seal between the discharge element 60 and the electrically conductive seal 37, the electrically conductive seal 37 can establish a gastight seal between the proximal end side GK and distal end side GS within the insulating spacer 41.

In addition, the particulate sensor 10 can have a simple structure in which the distal end side portion 38S of the second inner tube 38 and the pipe proximal end side portion 31K of the protector 31 are fixed to the insulating spacer 41 by means of the electrically conductive seal 37.

The insulating spacer 41, the protector 31, and the electrically conductive seal 37 will be described in further detail. The insulating spacer 41 has a stepped spacer ledge portion 41D protruding toward the radially inner side DI. Meanwhile, a portion of the protector 31 having an approximately cylindrical shape, which portion is located on the proximal end side GK and will be referred to as a pipe proximal end side portion 31K, has a stepped pipe shoulder portion 31KD tapered such that its diameter on the distal end side GS is smaller than that on the proximal end side GK. In addition, the pipe proximal end side portion 31K has a pipe proximal end portion 31KK which is located on the proximal end side GK of the pipe shoulder portion 31KD and includes a proximal end edge 31KF on the proximal end side GK. The pipe shoulder portion 31KD of the protector 31 is brought into engagement with the spacer ledge portion 41D of the insulating spacer 41 by moving the protector 31 from the proximal end side GK toward the distal end side GS. Namely, the protector 31 is fixed to the insulating spacer 41.

In addition, the electrically conductive seal 37 is in gastight close contact with the pipe proximal end portion 31KK of the pipe proximal end side portion 31K of the protector 31 from the proximal end side GK, the radially inner side DI, and the radially outer side DO, so that the electrically conductive seal 37 electrically communicates with the protector 31 (see FIGS. 2 and 4).

As described above, in the particulate sensor 10, since the electrically conductive seal 37 is in contact with the pipe proximal end portion 31KK of the protector 31, the protector 31 can be reliably maintained at the sensor ground potential SGND through the electrically conductive seal 37.

The discharge element 60 having the shape of a rectangular plate is held by the element holder 71 formed of insulating ceramic. This element holder 71 has a stepped holder shoulder portion 71D which is provided on its outer circumferential surface 71R and is tapered such that the diameter on the distal end side GS is smaller than that on the proximal end side GK. The element holder 71 also has an insertion hole 71H into which the discharge element 60 is inserted. An element insertion portion 60P of the discharge element 60 is located in the insertion hole 71H. The element insertion portion 60P is located between the element distal end portion 60S which protrudes into the protector 31 on the distal end side GS of the element holder 71 and the sealed portion 60C which is surrounded by the electrically conductive seal 37 and is in gastight close contact with the electrically conductive seal 37. The element insertion portion 60P of the discharge element 60 is held by the element holder 71 by means of a talc compact 72 charged into the insertion hole 71H (see also FIG. 6).

The holder shoulder portion 71D of the element holder 71 is engaged, through its movement from the proximal end side GK toward the distal end side GS, with the pipe shoulder portion 31KD of the protector 31. In addition, the element holder 71 comes into contact with the electrically conductive seal 37 from the distal end side GS, thereby holding the electrically conductive seal 37.

As described above, in the particulate sensor 10, the holder shoulder portion 71D of the element holder 71 is engaged with the pipe shoulder portion 31KD of the protector 31. Since the pipe shoulder portion 31KD of the protector 31 is engaged with the spacer ledge portion 41D of the insulating spacer 41, the element holder 71 is indirectly engaged with the insulating spacer 41. In addition, since the element holder 71 comes into contact with the electrically conductive seal 37 from the distal end side GS, it is possible to reliably prevent the electrically conductive seal 37 from moving toward the distal end side GS within the insulating spacer 41.

In the particulate sensor 10 of the present embodiment, the discharge element 60 having a rectangular plate like shape is inserted into the insertion hole 71H of the element holder 71 formed of insulating ceramic, and is fixed to the element holder 71 by means of the compressed talc compact 72 charged into a recess portion 71P of the insertion hole 71H having a larger diameter.

However, the discharge element 60 may be fixed to the element holder 71 without using the talc compact 72. For example, cement may be charged into recess portion 71P of the element holder 71 and is solidified so as to fix the discharge element 60 to the element holder 71. Alternatively, the electrically conductive glass used to form the electrically conductive seal 37 may be charged into the recess portion 71P of the element holder 71 so that the discharge element 60 is fixed to the element holder 71, and the element holder 71 and the electrically conductive seal 37 are joined together.

The first inner tube 39 and the second inner tube 38 are formed of metal, and the second inner tube 38 has the shape of a tube with a bottom; i.e., has a distal end bottom portion 38SS on the distal end side GS. The distal end bottom portion 38SS has an insertion hole 38SH into which the discharge element 60 is inserted. The second inner tube 38 surrounds the element proximal end side portion 60K of the discharge element 60 from the radially outer side DO. The distal end bottom portion 38SS of the second inner tube 38 comes into contact with the electrically conductive seal 37 from the proximal end side GK.

As described above, in the particulate sensor 10, since the first inner tube 39 and the second inner tube 38 include the second inner tube 38 having the distal end bottom portion 38SS, a Faraday cage can be formed by surrounding the element proximal end side portion 60K of the discharge element 60 by the second inner tube 38 from the radially outer side DO. In addition, since the distal end bottom portion 38SS of the second inner tube 38 is in contact with the electrically conductive seal 37, electrical communication can be appropriately established between the second inner tube and the electrically conductive seal 37, whereby the electrically conductive seal 37 can be maintained at the sensor ground potential SGND.

An element sleeve 73 formed of insulating ceramic is disposed in the distal end side portion 38S of the second inner tube 38 on the distal end side GS and is fixed as a result of crimping the distal end side portion 38S. The discharge element 60 extends toward the proximal end side GK through an insertion hole 73H of the element sleeve 73. On the proximal end side GK of the insulating spacer 41 and the second inner tube 38, an outer separator 74, a lower separator 75, and an upper separator 76, which are formed of insulating ceramic, are disposed to surround the circumference of the element proximal end side portion 60K of the discharge element 60.

Of these separators, the outer separator 74 located furthest to the distal end side GS is engaged, through its movement from the proximal end side GK toward the distal end side GS, with the second inner tube 38 and indirectly with the insulating spacer 41 via the second inner tube 38 such that the entire outer separator 74 is inserted into the insulating spacer 41 and the second inner tube 38. Each of the separators 74 to 76 is covered by the first inner tube 39 or the second inner tube 38 from the radially outer side DO, and the upper separator 76 located furthest to the proximal end side GK is covered by the first inner tube 39 from the proximal end side GK as well.

The first inner tube 39 has the tubular cable connection portion 39C projecting toward the proximal end side GK, and the discharge potential cable 82 is inserted into the cable connection portion 39C and is fixed thereto by crimping. More precisely, the outer conductor 82D of the discharge potential cable 82 electrically communicates with the first inner tube 39 within the cable connection portion 39C of the first inner tube 39. As a result, the first inner tube 39 electrically communicates with the inner circuit case 170 and the first output terminal 111 of the ion source power supply circuit 110 of the controller 100 through the outer conductor 82D of the discharge potential cable 82. As a result, all the first inner tube 39, the second inner tube 38, electrically conductive seal 37, and the protector 31 are maintained at the sensor ground potential SGND and surround the discharge element 60, thereby implementing the Faraday cage.

Next, the structure of the discharge element 60 used in the present embodiment will be described with reference to FIG. 6. The discharge element 60, which is formed of insulating ceramic and has a rectangular plate like shape, has a discharge electrode pad 62P and a shield electrode pad 63P1 on its first surface 60A (an upper surface in FIG. 6A). The discharge electrode pad 62P is located on the proximal end side GK with respect to the longitudinal center of the discharge element 60, and the shield electrode pad 63P1 is located on the distal end side GS with respect to the longitudinal center. As shown in FIG. 3, the discharge potential lead wire 82L, which is the core wire of the discharge potential cable 82, is connected to the discharge electrode pad 62P through a discharge potential connection terminal 81. As a result, the discharge electrode member 62, including the discharge electrode pad 62P, is maintained at the discharge potential DV, and the supply of electric current thereto is controlled by the ion source power supply circuit 110 through the discharge potential cable 82 (see FIG. 7).

The shield electrode pad 63P1 is formed to be located on the outer surface 60CS of the sealed portion 60C of the discharge element 60 and electrically communicates with electrically conductive seal 37, which surrounds the outer surface 60CS and is in gastight close contact with the outer surface 60CS (see FIG. 2). Accordingly, the shield electrode portion 63, including the shield electrode pad 63P1, is maintained at the sensor ground potential SGND.

Figure 6B:
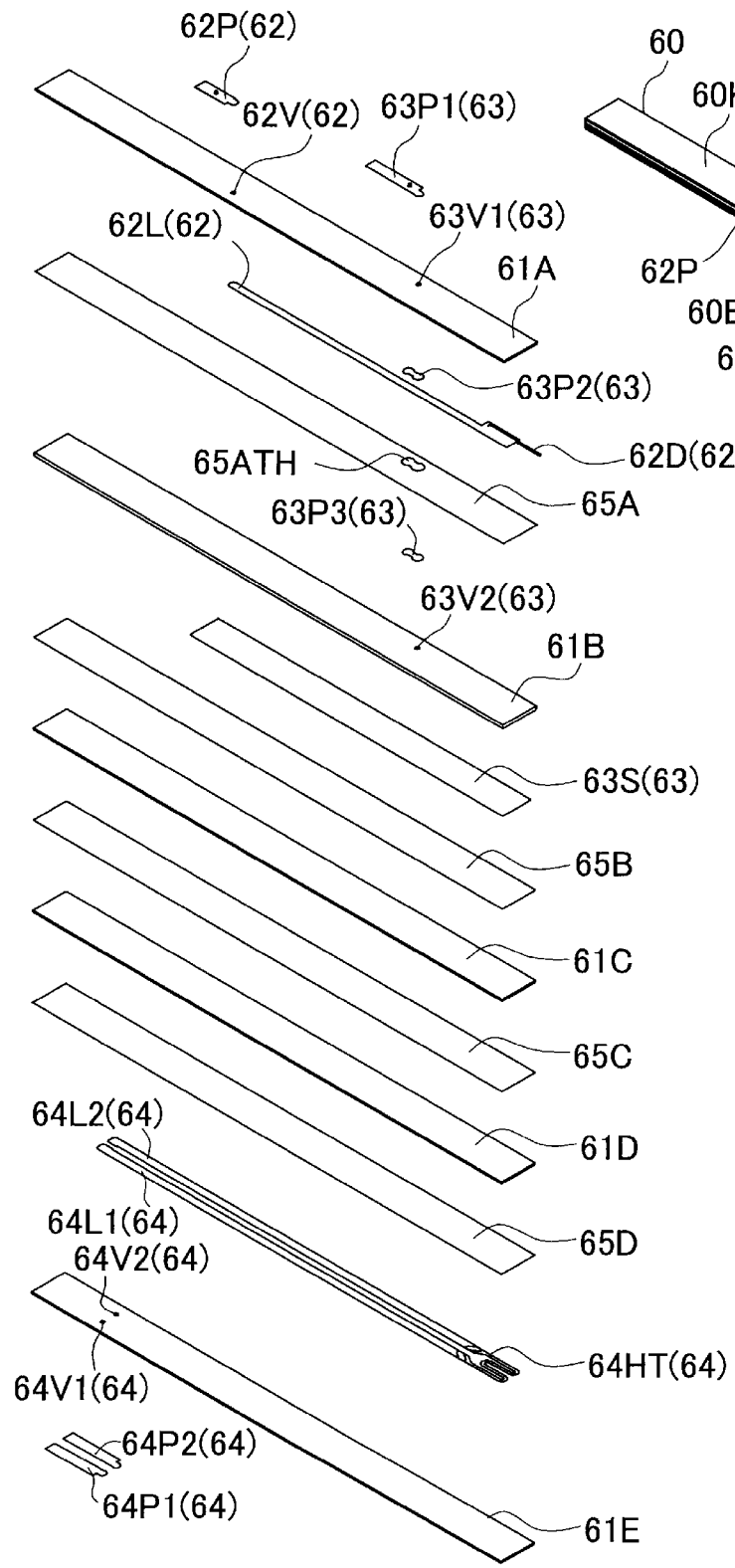
FIGS. 6A and 6B are views of the particulate sensor of the embodiment, wherein the section of FIG. 6A is a perspective view showing the form of the discharge element, and the section of FIG. 6B is an exploded perspective view showing the structure of the discharge element.
Figure 6A:
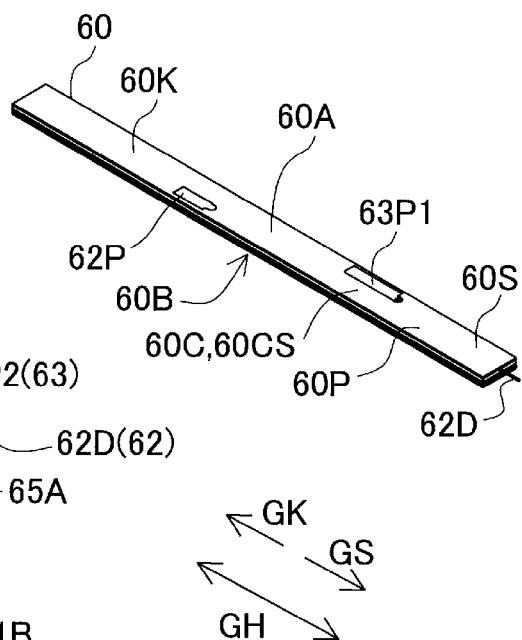

The discharge element 60 also has element heater pads 64P1 and 64P2 formed on its second surface 60B (lower surface in FIG. 6A) such that the element heater pads 64P1 and 64P2 are located on the proximal end side GK with respect to the longitudinal center (see FIG. 6B). As shown in FIG. 3, the element heater lead wires 84 and 86 are connected to the element heater pads 64P1 and 64P2 through element heater connection terminals 83 and 85. As a result, the supply of electric current to the element heater wiring line 64, including the element heater pads 64P1 and 64P2, is controlled by the element heater control circuit 150 through the element heater lead wires 84 and 86 (see FIG. 7).

The discharge element 60 includes ceramic layers 61A to 61E which are formed of insulating ceramic and each have the shape of a flat plate and bonding layers 65A to 65D each of which intervenes between adjacent ceramic layers and which bond the ceramic layers 61A to 61E together.

A generally flat, straight discharge wiring trace 62L and a needle-shaped electrode portion 62D are provided between the bonding layer 65A and the ceramic layer 61A to be located in a region toward the distal end side GS. The needle-shaped electrode portion 62D extends from the discharge wiring trace 62L toward the distal end side GS and protrudes from the element distal end portion 60S of the discharge element 60. The discharge wiring trace 62L electrically communicates with the discharge electrode pad 62P provided on the outer side surface of the ceramic layer 61A (i.e., on the first surface 60A of the discharge element 60) through a discharge electrode via 62V provided in the ceramic layer 61A.

As understood from FIG. 6B, the discharge wiring trace 62L of the discharge electrode member 62 is not exposed from the outer surface 60CS of the sealed portion 60C of the discharge element 60 and is located inside the discharge element 60. Therefore, even when the electrically conductive seal 37 is formed to adhere to the outer surface 60CS, the discharge wiring trace 62L of the discharge electrode member 62 does not electrically communicate with the electrically conductive seal 37, whereby the discharge wiring trace 62L and the electrically conductive seal 37 are insulated from each other.

Two flat, straight element heater lead wires 64L1 and 64L2 and an element heater portion 64HT are provided between the ceramic layer 61E and the bonding layer 65D. The element heater lead wires 64L1 and 64L2 are parallel to each other and extend in the axial direction GH. The element heater portion 64HT is formed by a meandering wiring which connects together ends of the element heater lead wires 64L1 and 64L2 on the distal end side GS. The element heater lead wires 64L1 and 64L2 electrically communicate, through element heater vias 64V1 and 64V2 provided in the ceramic layer 61E, with element heater pads 64P1 and 64P2 provided on the outer side surface of the ceramic layer 61E; i.e., the second surface 60B of the discharge element 60.

The element heater wiring line 64 composed of the above members is provided so as to raise the temperature of the element distal end portion 60S of the discharge element 60, thereby preventing adhesion of foreign particles such as soot to the element distal end portion 60S exposed to the gas under measurement SG and removing the foreign particles from the element distal end portion 60S.

As shown in FIG. 5, the element heater connection terminals 83 and 85 to which the element heater lead wires 84 and 86 are connected are in contact with the element heater pads 64P1 and 64P2. As described above, the element heater lead wire 86 is connected to the second output terminal 152 of the element heater control circuit 150 and is maintained at the chassis ground potential CGND. Meanwhile, the element heater lead wire 84 is connected to the first output terminal 151 of the element heater control circuit 150 and is maintained at the element heater potential EHV (see FIG. 7).

As understood from FIG. 6B, the element heater lead wires 64L1 and 64L2 of the element heater wiring line 64 are not exposed from the outer surface 60CS of the sealed portion 60C of the discharge element 60 and are located inside the discharge element 60. Therefore, even when the electrically conductive seal 37 is formed to adhere to the outer surface 60CS, the element heater lead wires 64L1 and 64L2 of the element heater wiring line 64 do not electrically communicate with the electrically conductive seal 37, whereby the element heater lead wires 64L1 and 64L2 are insulated from the electrically conductive seal 37.

A shield electrode layer 63S having the shape of a flat plate is provided between the ceramic layer 61B and the bonding layer 65B to be located in a region toward the distal end side GS. This shield electrode layer 63S electrically communicates, through shield electrode vias 63V2 and 63V1 and shield electrode pads 63P3 and 63P2 provided in and on the ceramic layers 61B and 61A, respectively, with a shield electrode pad 63P1 provided on the outer side surface of the ceramic layer 61A; i.e., the first surface 60A of the discharge element 60. The bonding layer 65A has a through hole 65ATH which accommodates the shield electrode pads 63P3 and 63P2, and the shield electrode pads 63P3 and 63P2 can come into contact with each other for electrical communication. Therefore, when the electrically conductive seal 37 is formed to adhere to the outer surface 60CS of the discharge element 60, the shield electrode pad 63P1 electrically communicates with the electrically conductive seal 37. As a result, the shield electrode portion 63 composed of the shield electrode layer 63S, the shield electrode vias 63V1 and 63V2, and the shield electrode pads 63P1, 63P2 and 63P3 electrically communicates with the electrically conductive seal 37 and is maintained at the sensor ground potential SGND.

As described above, in the particulate sensor 10 of the present embodiment, the element distal end portion 60S of the discharge element 60, which portion is exposed to the gas under measurement SG, has the element heater wiring line 64 for heating the element distal end portion 60S. One end (the element heater pad 64P2) of the element heater wiring line 64 is connected to the line of the chassis ground potential CGND via the element heater lead wire 86.

Therefore, in the case where the element heater wiring line 64 for heating the element distal end portion 60S is provided, due to discharge at the discharge electrode member 62, an induced current flows through the element heater wiring line 64. Therefore, in the controller 100 (see FIG. 7) which controls the particulate sensor 10, the chassis ground potential CGND of the line to which one end (the element heater pad 64P2) of the element heater wiring line 64 is connected changes, and thus, noise may be superimposed on the output signal of the particulate sensor 10 (the output signal from the measurement control circuit 120).

In order to overcome such a problem, in the present embodiment, as understood from FIG. 6B, the shield electrode layer 63S maintained at the sensor ground potential SGND intervenes between the discharge wiring trace 62L of the discharge electrode member 62 and the element heater lead wires 64L1 and 64L2 and the element heater portion 64HT of the element heater wiring line 64 and provides an electromagnetic shield between the discharge wiring trace 62L and the element heater lead wires 64L1 and 64L2 and the element heater portion 64HT.

As a result, it is possible to prevent induced current from flowing through the element heater wiring line 64, which flow would otherwise occur due to discharge at the discharge electrode member 62. Thus, changes in the chassis ground potential CGND, and resultant superimposition of noise on the output signal of the particulate sensor 10 (the output signal from the measurement control circuit 120) can be suppressed.

In addition, the shield electrode layer 63S electrically communicates with the electrically conductive seal 37, whereby the shield electrode layer 63S is maintained at the sensor ground potential SGND. Specifically, since the shield electrode pad 63P1 electrically communicating with the shield electrode layer 63S is provided on the outer surface 60CS of the sealed portion 60C, the shield electrode pad 63P1 can easily establish electrical communication with the electrically conductive seal 37 so as to maintain the shield electrode layer 63S at the sensor ground potential SGND. Therefore, it is unnecessary to provide wiring within the particulate sensor 10 so as to supply the sensor ground potential SGND to the shield electrode layer 63S of the discharge element 60, thereby maintaining the shield electrode layer 63S at the sensor ground potential SGND. Also, since the shield electrode layer 63S is connected to the electrically conductive seal 37 through the shield electrode pad 63P1 having a given area, reliable electrical communication can be established between the electrically conductive seal 37 and the shield electrode pad 63P1 and thus the shield electrode layer 63S.

Next, the structure of the protector 31 and the detection of particulates S in the particulate sensor 10 will be described with reference to FIGS. 2, 4, 5 and 8. The protector 31 is composed of a cylindrical protector main body 32 having a tapered end on the distal end side GS and a plurality of (four in the present embodiment) trap members 33 to 36 accommodated within the protector main body 32.

The plurality of gas introduction openings 32I are formed in a portion of the protector 31 (the protector main body 32) on the proximal end side GK at equal intervals in the circumferential direction (see FIG. 5). Through the gas introduction openings 32I, the gas under measurement SG containing the particulates S is introduced into the internal space K of the protector 31. The gas introduction openings 32I are located on the radially inner side DI of the tubular wall portion 21W of the metallic mounting member 21. The gas discharge opening 32O for discharging the introduced gas under measurement SG is formed in a distal end portion of the protector 31 (the protector main body 32). The gas discharge opening 32O is a single circular opening whose center coincides with the axial line AX of the particulate sensor 10.

The element distal end portion 60S of the discharge element 60 protrudes into the internal space K of the protector 31 (the protector main body 32) located on the distal end side GS of the element holder 71. When corona discharge (gaseous discharge) is generated between the needle-shaped electrode portion 62D maintained at the discharge potential DV and the protector 31 maintained at the sensor ground potential SGND, ions CP are generated in the internal space K as a result of ionization of oxygen molecules or the like. Therefore, when the gas under measurement SG is caused to flow into the internal space K, the ions CP adhere to the particulates S contained in the gas under measurement SG, whereby electrified particulates SC are produced. The electrified particulates SC are discharged to the exhaust pipe EP through the gas discharge opening 32O. The electric charge corresponding to discharged ions CPH which are the ions CP discharged as described above is detected as the signal current Is.

In order to prevent floating ions CPF having failed to adhere to the particulates S from being discharged through the gas discharge opening 32O, the trap members 33 to 36 form a labyrinthine flow passage within the protector 31 through which the gas under measurement SG flows. As a result, the floating ions CPF in the gas under measurement SG efficiently adhere to the trap members 33 to 36 maintained at the sensor ground potential SGND.

Namely, as understood from FIGS. 5 and 8, the trap members 33 to 36 have plate-shaped portions 33*b*, 34*b*, 35*b* and 36*b* each having one or a plurality of through holes 33*d*, 34*d*, 35*d* and 36*d*. The through holes 33*d*, 34*d*, 35*d* and 36*d* are arranged such that, as viewed in the axial direction GH, the through hole(s) provided in a certain trap member do not overlap the through hole(s) provided in another trap member located adjacent to the certain trap member. Therefore, as indicated by broken line arrows in FIG. 8, when the gas under measurement SG flows through the through holes 33*d*, 34*d* and 35*d* of the trap members 33 to 35, the gas under measurement SG flows along flow passages in which the gas under measurement SG hits against the plate-shaped portions 34*b*, 35*b* and 36*b* of the trap members 34 to 36. Therefore, the floating ions CPF in the gas under measurement SG become more likely to collide with the plate-shaped portions 34*b* to 36*b* of the trap members 34 to 36 maintained at the sensor ground potential SGND or to be attracted thereby, whereby the discharge of the floating ions CPF through the gas discharge opening 32O is restrained.

In the particulate detection system 1 which includes the particulate sensor 10 having the above-described structure and the controller 100 connected thereto, the particulate sensor 10 which gastightly holds the discharge element 60 therein using a simple structure is used. Therefore, the particulate detection system 1 can be fabricated inexpensively.

Next, a method for manufacturing the particulate sensor 10 will be described with reference to FIG. 9. The discharge element 60 prepared in advance is inserted into the insertion hole 71H of the element holder 71, and talc powder is charged into the recess portion 71P of the element holder 71 and compressed, whereby the element insertion portion 60P of the discharge element 60 is provisionally fixed to the element holder 71.

Subsequently, the protector 31 is inserted into the insulating spacer 41 such that the pipe shoulder portion 31KD of the protector 31 engages the spacer ledge portion 41D of the insulating spacer 41. Further, the element holder 71 having the discharge element 60 provisionally fixed thereto 60 is inserted into the protector 31 such that the holder shoulder portion 71D of the element holder 71 engages the pipe shoulder portion 31KD of the protector 31.

After establishing a state in which the insulating spacer 41, etc., are held such that the protector 31 is located on the lower side; i.e., after the attitudes of the insulating spacer 41, the protector 31, etc., are determined such that their ends on the distal end side GS face downward, a predetermined amount of electrically conductive glass powder is charged into the insulating spacer 41. Further, the electrically conductive glass powder charged around the discharge element 60 is compressed toward the distal end side GS through use of an unillustrated press jig.

As a result, the outer surface 60CS of the sealed portion 60C of the discharge element 60, which portion is located on the proximal end side GK of the element insertion portion 60P, is surrounded by the compressed electrically conductive glass powder.

As described above, the pipe proximal end side portion 31K of the protector 31 has the stepped pipe shoulder portion 31KD and also has the proximal end portion 31KK located on the proximal end side GK of the pipe shoulder portion 31KD and having the proximal end edge 31KF on the proximal end side GK. Therefore, the electrically conductive glass powder comes into contact with the pipe proximal end portion 31KK of the protector 31 from the radially outer side DO.

Separately, the element sleeve 73 is inserted into the distal end side portion 38S of the second inner tube 38, and the distal end side portion 38S is deformed by crimping, whereby the element sleeve 73 is fixed inside the distal end side portion 38S. The discharge element 60 is inserted into the insertion holes 38SH and 73H of the second inner tube 38 and the element sleeve 73, and the distal end bottom portion 38SS of the second inner tube 38 is butted against the compressed electrically conductive glass powder charged in the insulating spacer 41.

Further, a seal forming step is performed in a state in which the compressed electrically conductive glass powder charged in the insulating spacer 41 is in close contact with the outer surface 60CS of the sealed portion 60C of the discharge element 60 and in contact with the distal end bottom portion 38SS of the second inner tube 38 and the pipe proximal end portion 31KK of the protector 31. In the seal forming step, the assembly of the above-mentioned components is inserted into a tubular furnace (not shown). Then, the insulating spacer 41 is heated from the radially outer side so as to raise the temperature of the electrically conductive glass to a temperature slightly higher than the softening point, thereby melting the electrically conductive glass powder. The electrically conductive seal 37 of the electrically conductive glass is thus formed.

Next, the assembly of the insulating spacer 41, etc., is removed from the tubular furnace, and within a period during which the electrically conductive seal 37 is in a molten state (the electrically conductive glass is soft), as indicated by an arrow in FIG. 9, a downward pressing force FP (i.e., a pressing force FP toward the distal end side GS) is applied to the element sleeve 73 through use of an unillustrated pressing jig. Subsequently, the assembly is gradually cooled with the pressing force maintained, whereby the electrically conductive seal 37 is solidified. As a result, the electrically conductive seal 37 formed of the electrically conductive glass adheres to the protector 31, the insulating spacer 41, the element holder 71, the talc compact 72, the second inner tube 38 and the discharge element 60.

As described above, without use of a separate die for forming the electrically conductive seal 37, it is possible to easily manufacture the particulate sensor 10 in which the electrically conductive seal 37 is reliably brought into contact with the second inner tube 38 and the protector 31 for electrical communication therewith and the electrically conductive seal 37 is brought into close contact with the sealed portion 60C of the discharge element 60.

In addition, in the above-described seal forming step, the electrically conductive seal 37 of electrically conductive glass is formed such that the electrically conductive seal 37 is in close contact with the shield electrode pad 63P1 provided on the discharge element 60.

Therefore, the shield electrode layer 63S is electrically connected, without fail, with the electrically conductive seal 37 through the shield electrode pad 63P1, whereby the shield electrode layer 63S can be maintained at the sensor ground potential SGND without fail.

Furthermore, in the above-described seal forming step, the electrically conductive seal 37 is formed so as also to be in close contact with the inner circumferential surface 41I of the insulating spacer 41, the distal end side portion 38S of the second inner tube 38, and the pipe proximal end side portion 31K of the protector 31.

Therefore, it is possible to manufacture the particulate sensor 10 in which the electrically conductive seal 37 is in gastight close contact with the inner circumferential surface 41I of the insulating spacer 41, whereby, on the radially inner side DI of the insulating spacer 41, a gastight seal is formed between the proximal end side GK and the distal end side GS by the electrically conductive seal 37.

Also, via the electrically conductive seal 37, the distal end side portion 38S of the second inner tube 38 and the pipe proximal end side portion 31K of the protector 31 can be easily and reliably fixed to the inner circumferential surface 41I of the insulating spacer 41.

After the electrically conductive seal 37 is formed as described above, the insulating spacer 41 is inserted into the metallic mounting member 21. Subsequently, the annular insulating holder 42, the annular talc compact 43 formed of talc powder, the annular insulating sleeve 44, and the wire packing 45 are inserted into the space between the metallic mounting member 21 and the insulating spacer 41, and the proximal end 21KK of the metallic mounting member 21 is crimped such that the proximal end 21KK is bent inward, whereby the insulating spacer 41 is held inside the metallic mounting member 21.

Next, the outer separator 74 and the lower separator 75 are inserted into the second inner tube 38 in this order. Further, the discharge potential connection terminal 81 crimp-connected to the end of the discharge potential lead wire 82L of the discharge potential cable 82 is disposed at a predetermined position in the lower separator 75, so that the discharge potential connection terminal 81 is brought into contact with the discharge electrode pad 62P of the discharge element 60 (see FIG. 3). As a result, the discharge potential DV generated at the second output terminal 112 of the ion source power supply circuit 110 in the controller 100 can be applied to the discharge electrode member 62 of the discharge element 60.

Subsequently, the upper separator 76 is set on the proximal end side GK of the lower separator 75, and the element heater connection terminals 83 and 85 crimp-connected to the ends of the element heater lead wires 84 and 86 are disposed at predetermined positions in the upper separator 76, so that the element heater connection terminals 83 and 85 are brought into contact with the element heater pads 64P1 and 64P2, respectively, of the discharge element 60 (see FIG. 3). As a result, the element heater control circuit 150 in the controller 100 can apply a voltage to the element heater portion 64HT of the element heater wiring line 64 of the discharge element 60.

Subsequently, the first inner tube 39 is externally fitted onto the upper separator 76 from the proximal end side GK, and overlapping portions of the first inner tube 39 and the second inner tube 38 are crimped for integration.

Further, the circumference of the cable connection portion 39C of the first inner tube 39 through which the discharge potential cable 82 extends is crimped so as to fix the discharge potential cable 82 to the cable connection portion 39C and establish electrical communication between the outer conductor 82D of the discharge potential cable 82 and the cable connection portion 39C. As a result, the sensor ground members 30 (the first inner tube 39, etc.) electrically communicate with the first output terminal 111 (maintained at the sensor ground potential SGND) of the ion source power supply circuit 110 in the controller 100.

Meanwhile, the spacer heater connection terminals 91 and 93 provided at the ends of the spacer heater lead wires 92 and 94, respectively, are joined to the spacer heater layer 41HT of the insulating spacer 41 (specifically, unillustrated connection pads of the spacer heater layer 41HT).

Further, the outer tube 22 is externally fitted to the metallic mounting member 21 such that the distal end portion 22S of the outer tube 22 overlaps with the proximal end portion 21K of the metallic mounting member 21, and the distal end portion 22S of the outer tube 22 is laser-welded to the proximal end portion 21K of the metallic mounting member 21.

Subsequently, the grommet 46 is inserted into the proximal end portion 22K of the outer tube 22, the braided tube 23 and the braided tube holding metallic member 24 are fitted onto the circumferential surface of the proximal end portion 22K of the outer tube 22 on the radially outer side DO, and the circumference of the braided tube holding metallic member 24 is crimped. As a result, the discharge potential cable 82, the element heater lead wires 84 and 86, and the spacer heater lead wires 92 and 94, which extend through the grommet 46 are held by the grommet 46.

Thus, the particulate detection system 1 and the particulate sensor 10 connected to the controller 100 through the discharge potential cable 82, the element heater lead wires 84 and 86, the spacer heater lead wires 92 and 94, and the braided tube 23 are completed.

First Modification

Next, a particulate sensor 210 according to a first modification will be described with reference to FIG. 10 and FIGS. 2, 4, and 9. The particulate sensor 210 of the present first modification is identical with the particulate sensor 10 of the embodiment, except that a discharge element 260 differs in form from that of the particulate sensor 10 (FIG. 10) and except that an electrically conductive seal 237 has a two-layer structure (FIGS. 2, 4, and 9). Therefore, portions differing from those of the particulate sensor 10 will be mainly described. Portions identical with those of the particulate sensor 10 are denoted by the same reference numerals, and their descriptions will be omitted or simplified.

First, the structure of the discharge element 260 used in the particulate sensor 210 of the present first modification will be described with reference to FIG. 10. The discharge element 260 has the same shape as the discharge element 60 and is a multi-layer wiring board formed of insulating ceramic and having the shape of a rectangular plate. In this discharge element 260 too, a discharge electrode pad 62P of the same shape is formed at the same position as in the discharge element 60 of the embodiment. Accordingly, the discharge electrode member 62, including the discharge electrode pad 62P, is maintained at the discharge potential DV, and the supply of electric current to the discharge electrode member 62 is controlled by the ion source power supply circuit 110 through the discharge potential cable 82 (see FIG. 7). Also, element heater pads 264P1 and 264P2 are formed at the same positions as the element heater pads 64P1 and 64P2 in the discharge element 60 of the embodiment. Therefore, the supply of electric current to an element heater wiring line 264, including the element heater pads 264P1 and 264P2, is controlled by the element heater control circuit 150 through the element heater lead wires 84 and 86.

However, unlike the discharge element 60 of the embodiment in which the shield electrode pad 63P1 is formed on the first surface 60A (the upper surface in FIG. 6A), in the discharge element 260 of the present first modification, a shield electrode pad 263P1 is formed on a second surface 260B (the lower surface in FIG. 10A, the upper surface in FIG. 10B) opposite a first surface 260A.

Notably, like the shield electrode pad 63P1 of the discharge element 60 of the embodiment, the shield electrode pad 263P1 is formed to be located on an outer surface 260CS of a sealed portion 260C of the discharge element 260 and electrically communicates with an electrically conductive seal 237 which surrounds the outer surface 260CS and is in gastight close contact with the outer surface 260CS (see FIG. 2). Accordingly, the shield electrode portion 263, including the shield electrode pad 263P1, is also maintained at the sensor ground potential SGND.

The structure of the discharge element 260 will now be described. The discharge element 260 includes ceramic layers 261A to 261E which are formed of insulating ceramic and each has the shape of a flat plate and bonding layers 265A to 265D each of which intervenes between adjacent ceramic layers and which bond the ceramic layers 261A to 261E together.

Figure 10A:
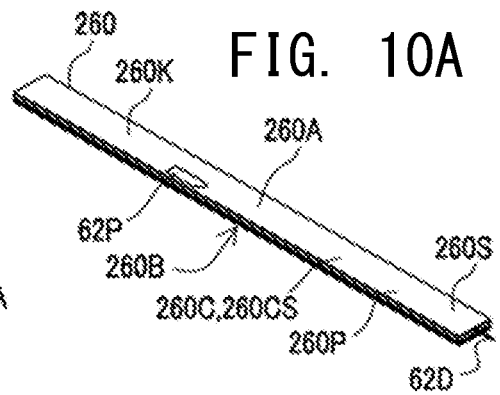
FIGS. 10A to 10C are views of the particulate sensor of the first modification, wherein the sections of FIGS. 10A and 10B are perspective views showing the form of the discharge element, and the section of FIG. 10C is an exploded perspective view showing the structure of the discharge element.
Figure 10B:
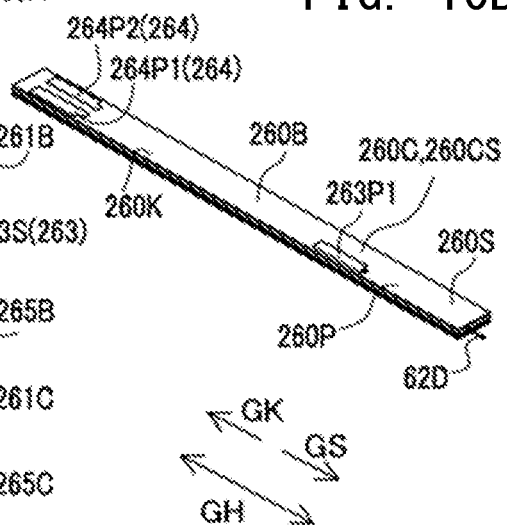
Figure 10C:
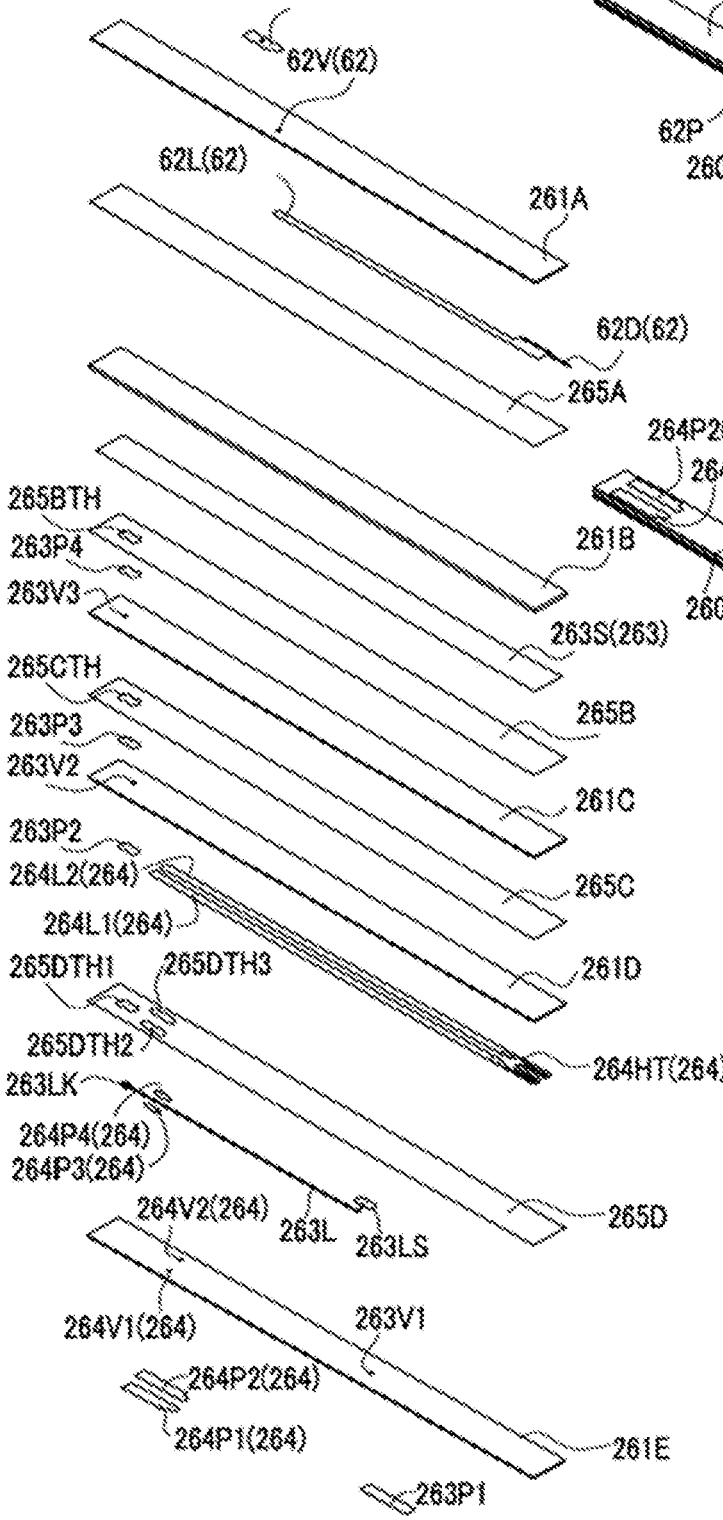

As in the case of the discharge element 60 of the embodiment, the generally flat, straight discharge wiring trace 62L and the needle-shaped electrode portion 62D are provided between the ceramic layer 261A, which is the uppermost layer in FIG. 10C, and the bonding layer 265A to be located in a region toward the distal end side GS. The needle-shaped electrode portion 62D extends from the discharge wiring trace 62L toward the distal end side GS and protrudes from the element distal end portion 260S of the discharge element 260. The discharge wiring trace 62L electrically communicates with the discharge electrode pad 62P provided on the outer side surface of the ceramic layer 261A (i.e., on the first surface 260A of the discharge element 260) through the discharge electrode via 62V provided in the ceramic layer 261A.

As in the case of the element heater wiring line 64 of the discharge element 60 of the embodiment, two flat, straight element heater lead wires 264L1 and 264L2 and an element heater portion 264HT are provided between the bonding layer 265D and the ceramic layer 261D which is the second from the bottom. The element heater lead wires 264L1 and 264L2 are parallel to each other and extend in the axial direction GH. The element heater portion 264HT is formed by meandering wiring which connects together ends of the element heater lead wires 264L1 and 264L2 on the distal end side GS. However, unlike the embodiment, the element heater lead wires 264L1 and 264L2 electrically communicate, through element heater pads 264P3 and 264P4 provided in through holes 265DTH2 and 265DTH3 of the bonding layer 265D and the element heater vias 264V1 and 264V2 provided in the ceramic layer 261E, with element heater pads 264P1 and 264P2 provided on the outer side surface of the ceramic layer 261E; i.e., the second surface 260B of the discharge element 260.

As in the case of the shield electrode layer 63S of the embodiment, a shield electrode layer 263S having the shape of a rectangular flat plate is provided between the ceramic layer 261B and the bonding layer 265B. However, the shield electrode layer 263S in the present first modification has the shape of a rectangular flat plate which extends further toward the proximal end side GK as compared with the shield electrode layer 63S of the embodiment.

The shield electrode layer 263S electrically communicates, through shield electrode vias 263V1, 263V2 and 263V3 and shield electrode pads 263P2, 263P3 and 263P4 provided in and on the ceramic layers 261C to 261E, respectively, and through a generally flat, straight shield wiring trace 263L provided between the bonding layer 265D and the ceramic layer 261E, with a shield electrode pad 263P1 provided on the outer side surface of the ceramic layer 261E; i.e., the second surface 260B of the discharge element 260. The bonding layers 265B, 265C and 265D respectively have through holes 265BTH, 265CTH and 265DTH1 which accommodate the shield electrode pads 263P4, 263P3 and 263P2, respectively, and the shield electrode pads 263P4, 263P3 and 263P2 can electrically communicate with one another though the shield electrode vias 263V3 and 263V2. A proximal end side portion 263LK of the shield wiring trace 263L is connected to the shield electrode pad 263P2 and a shield electrode pad 263LS disposed on the distal end side of the shield wiring trace 263L is connected to the shield electrode pad 263P1 through the shield electrode via 263V1.

Accordingly, when the electrically conductive seal 237 is formed to adhere to the outer surface 260CS of the sealed portion 260C of the discharge element 260, the shield electrode pad 263P1 electrically communicates with the electrically conductive seal 237. As a result, the shield electrode portion 263 composed of the shield electrode layer 263S, the shield electrode vias 263V1, 263V2 and 263V3, the shield electrode pads 263P1, 263P2, 263P3 and 263P4, and the shield wiring trace 263L electrically communicates with the electrically conductive seal 237 and is maintained at the sensor ground potential SGND.

Thus, the shield electrode layer 263S is maintained at the sensor ground potential SGND and provides an electromagnetic shield between the element heater wiring line 264 and the discharge electrode member 62. As a result, it is possible to prevent induced current from flowing through the element heater wiring line 264, which flow would otherwise occur due to discharge at the discharge electrode member 62. Thus, changes in the chassis ground potential CGND, and resultant superimposition of noise on the output signal of the particulate sensor 210 can be suppressed.

Notably, in the case of the discharge element 60 of the above-described embodiment (see FIG. 6), since the discharge wiring trace 62L of the discharge electrode member 62 to which high voltage is applied and the shield electrode pad 63P2 of the shield electrode portion 63 maintained at the sensor ground potential SGND are close to each other, a short circuit may be formed therebetween.

In order to overcome such a drawback, in the particulate sensor 210 of the present first modification, as described above, the shield electrode pad 263P1 electrically communicating with the electrically conductive seal 237 is provided on the second surface 260B of the discharge element 260, which surface is opposite the first surface 260A on which the discharge electrode pad 62P is provided. Also, whereas the discharge electrode member 62 is configured such that an electrical path extends from the discharge wiring trace 62L toward the first surface 260A (the upper side in FIG. 10C) through the discharge electrode via 62V and the discharge electrode pad 62P, the shield electrode portion 263 is configured such that an electrical path extends from the shield electrode layer 263S toward the second surface 260B (the lower side in FIG. 10C). Since the distance between the discharge electrode member 262 to which high voltage is applied and the shield electrode portion 263 maintained at the sensor ground potential SGND is larger than the distance between the discharge electrode member 62 and the shield electrode portion 63 in the discharge element 60 of the embodiment, the possibility of forming a short circuit between the discharge electrode member 262 and the shield electrode portion 263 can be reduced.

Next, the structure of the electrically conductive seal 237 in the particulate sensor 210 of the present first modification will be described. In the particulate sensor 10 according to the above-described embodiment, the electrically conductive seal 37 is formed of electrically conductive glass whose composition is uniform The electrically conductive seal 237 in the particulate sensor 210 of the present first modification has the same shape as the electrically conductive seal 37 according to the embodiment. However, as indicated by broken lines in FIGS. 2, 4, and 9, the electrically conductive seal 237 differs from the electrically conductive seal 37 of the embodiment in that the electrically conductive seal 237 has a two-layer structure; i.e., is divided, in the axial direction GH, into a first electrically conductive seal 237A located on the distal end side GS and a second electrically conductive seal 237B located on the proximal end side GK of the first electrically conductive seal 237A and formed of electrically conductive glass different from that of the first electrically conductive seal 237A.

Specifically, in the electrically conductive seal 237 having a two-layer structure, the first electrically conductive seal 237A on the distal end side GS is formed of an electrically conductive glass which has a relatively low softening point and a high degree of adhesion so as to enhance adhesion to the pipe proximal end portion 31KK of the protector 31 formed of metal and to enhance adhesion to the discharge element 260 formed of ceramic, the inner circumferential surface 41I of the insulating spacer 41 formed of ceramic, and the element holder 71 formed of ceramic.

Meanwhile, the second electrically conductive seal 237B on the proximal end side GK is formed of an electrically conductive glass which has a higher electrical conductivity than the electrically conductive glass used for the first electrically conductive seal 237A. This is done in order to enhance electrical conduction to the distal end bottom portion 38SS of the second inner tube 38 formed of metal and to enhance electrical conduction to the shield electrode portion 263 (specifically, the shield electrode pad 263P1) exposed from the outer surface 260CS of the sealed portion 260C of the discharge element 260.

Notably, such an electrically conductive seal 237 is formed by heating and melting electrically conductive glass powder, and by compressing the molten glass as in the case of forming the electrically conductive seal 37 during manufacture of the particulate sensor 10 of the embodiment.

However, the first electrically conductive seal 237A and the second electrically conductive seal 237B are formed separately. Specifically, after the attitudes of the insulating spacer 41, the protector 31, etc. are determined such that their ends on the distal end side GS face downward, the electrically conductive glass powder for the first electrically conductive seal 237A is first charged into the insulating spacer 41. Subsequently, through use of an unillustrated press jig, the electrically conductive glass powder for the first electrically conductive seal 237A charged around the discharge element 60 is pressed toward the distal end side GS. Further, the electrically conductive glass powder for the second electrically conductive seal 237B is charged into the insulating spacer 41. Subsequently, through use of the press jig, the two layers of electrically conductive glass powder are pressed toward the distal end side GS, whereby the compressed two layers of electrically conductive glass powder are obtained. Subsequently, as in the case of forming the electrically conductive seal 37, the compressed two layers of electrically conductive glass powder are softened by applying heat and are compressed, whereby the electrically conductive seal 237 is formed.

In the particulate sensor 210 of the present first modification as well, the discharge element 260 is held gastightly by the electrically conductive seal 237 at the sealed portion 260C. In addition, electrical communication is established between the second inner tube 38 and the protector 31 by the electrically conductive seal 237. Therefore, a metal block, such as a metallic shell, is not needed for establishing electrical communication between the protector 31 and the first inner tube 39 or the second inner tube 38 so as to maintain the protector 31 at the sensor ground potential SGND. Therefore, the particulate sensor 210 can gastightly hold the discharge element 260 therein in spite of its simple structure.

Also, since the shield electrode layer 263S is maintained at the sensor ground potential SGND through the shield electrode pad 263P1 electrically communicating with the electrically conductive seal 237, wiring for supplying the sensor ground potential SGND to the shield electrode layer 263S of the discharge element 260 is not required in the particulate sensor 210.

In addition, since the shield electrode layer 263S is connected to the electrically conductive seal 237 through the shield electrode pad 263P1 having a given area, reliable electrically communication can be established between the electrically conductive seal 237 and the shield electrode pad 263P1 and thus the shield electrode layer 263S.

Second Modification

Figure 11A:
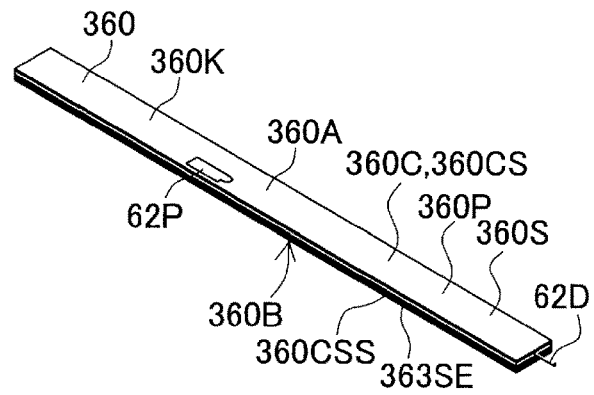
FIGS. 11A to 11C are views of the particulate sensor of the second modification, wherein the section of FIG. 11A is a perspective view showing the form of the discharge element, the section of FIG. 11B is an enlarged partial perspective view showing the form of the discharge element in the vicinity of a sealed portion thereof, and the section of FIG. 11C is an exploded perspective view showing the structure of the discharge element.

Next, a particulate sensor 310 according to a second modification will be described with reference to FIG. 11. The particulate sensor 310 of the present second modification is identical with the particulate sensor 10 of the embodiment and the particulate sensor 210 of the first modification, except for the form of a discharge element 360. Therefore, portions differing from those of the particulate sensors 10 and 210 will be mainly described. Portions identical with those of the particulate sensors 10 and 210 are denoted by the same reference numerals, and their descriptions will be omitted or simplified.

First, the structure of the discharge element 360 used in the particulate sensor 310 of the present second modification will be described with reference to FIG. 11. The discharge element 360 has the same shape as the discharge element 60 and is a multi-layer wiring board formed of insulating ceramic and having the shape of a rectangular plate. In this discharge element 360 too, a discharge electrode pad 62P of the same shape is formed at the same position as in the discharge element 60 of the embodiment. Accordingly, the discharge electrode member 62, including the discharge electrode pad 62P, is maintained at the discharge potential DV, and the supply of electric current to the discharge electrode member 62 is controlled by the ion source power supply circuit 110 through the discharge potential cable 82 (see FIG. 7). Also, the element heater pads 64P1 and 64P2 having the same shape are formed at the same positions as the element heater pads 64P1 and 64P2 in the discharge element 60 of the embodiment (see FIG. 6). Therefore, the supply of electric current to the element heater wiring line 64, including the element heater pads 64P1 and 64P2, is controlled by the element heater control circuit 150 through the element heater lead wires 84 and 86.

However, in the discharge element 60 of the embodiment, the shield electrode pad 63P1 is formed on the first surface 60A (the upper surface in FIG. 6A), and, in the discharge element 260 of the first modification, the shield electrode pad 263P1 is formed on the second surface 260B (the lower surface in FIG. 10A, the upper surface in FIG. 10B) opposite the first surface 260A.

In contrast, in the discharge element 360 of the present second modification, no shield electrode pad is formed on the first surface 360A and the second surface 360B (the upper and lower surfaces in FIG. 11A), and extension portions 363SE of the shield electrode layer 363S are exposed from side portions 360CSS of the outer surface 360CS of the sealed portion 360C of the discharge element 360, which portions partially form the side surfaces of the discharge element 360.

Therefore, the shield electrode layer 363S of the present second modification electrically communicates, at its extension portions 363SE, with the electrically conductive seal 37 which surrounds the outer surface 360CS of the sealed portion 360C of the discharge element 360 and is in gastight close contact with the outer surface 360CS (see FIG. 2). Accordingly, the shield electrode layer 363S is directly maintained at the sensor ground potential SGND.

The structure of the discharge element 360 will now be described (see FIG. 11). As in the case of the discharge element 60 of the embodiment, the discharge element 360 includes ceramic layers 361A to 361E which are formed of insulating ceramic and each has the shape of a flat plate and bonding layers 365A to 365D each of which intervenes between adjacent ceramic layers and which bond the ceramic layers 361A to 361E together.

Figure 11B:
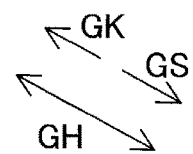
Figure 11C:
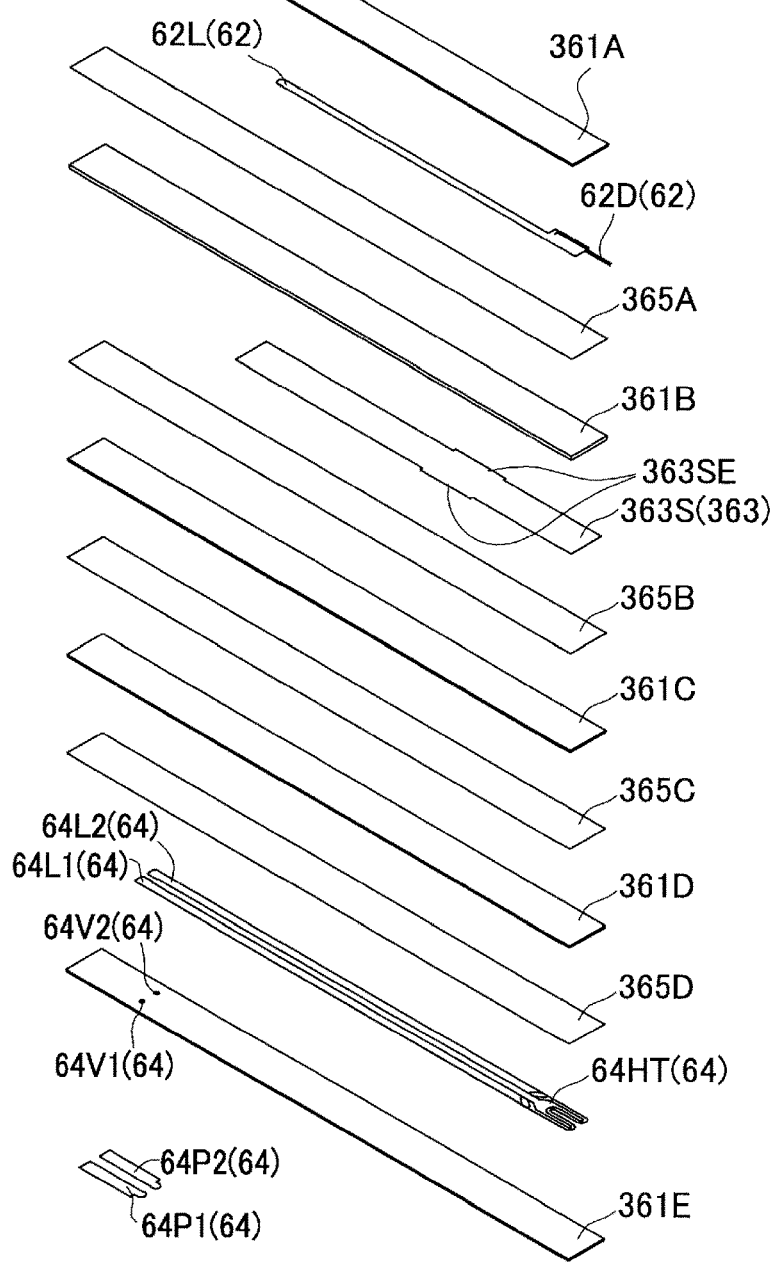

As in the case of the discharge element 60 of the embodiment, the generally flat, straight discharge wiring trace 62L and the needle-shaped electrode portion 62D are provided between the ceramic layer 361A, which is the uppermost layer in FIG. 11C, and the bonding layer 365A to be located in a region toward the distal end side GS. The needle-shaped electrode portion 62D extends from the discharge wiring trace 62L toward the distal end side GS and protrudes from the element distal end portion 360S of the discharge element 360. The discharge wiring trace 62L electrically communicates with the discharge electrode pad 62P provided on the outer side surface of the ceramic layer 361A (i.e., on the first surface 360A of the discharge element 360) through the discharge electrode via 62V provided in the ceramic layer 361A.

As in the case of the discharge element 60 of the embodiment, the two element heater lead wires 64L1 and 64L2 and the element heater portion 64HT which connects together ends of the element heater lead wires 64L1 and 64L2 on the distal end side GS are provided between the lowermost ceramic layer 361E and the bonding layer 365D. The element heater lead wires 64L1 and 64L2 electrically communicate, through the element heater vias 64V1 and 64V2 provided in the ceramic layer 361E, with the element heater pads 64P1 and 64P2 provided on the outer side surface of the ceramic layer 61E; i.e., the second surface 360B of the discharge element 360.

As in the case of the shield electrode layer 63S of the embodiment, a shield electrode layer 363S having the shape of a generally rectangular flat plate is provided between the ceramic layer 361B and the bonding layer 365B. However, the shield electrode layer 363S in the present second modification has an increased width in a region contained in the sealed portion 360C of the discharge element 360, whereby the extension portions 363SE are provided.

The extension portions 363SE of the shield electrode layer 363S are exposed from the side portions 360CSS of the outer surface 360CS of the sealed portion 360C of the discharge element 360 (see FIG. 11B).

Therefore, when the electrically conductive seal 37 is formed to adhere to the outer surface 360CS of the sealed portion 360C of the discharge element 360, the extension portions 363SE of the shield electrode layer 363S come into contact with the electrically conductive seal 37 for electrical communication therewith (see FIG. 2). As a result, the shield electrode layer 363S is maintained at the sensor ground potential SGND. Notably, in the present second modification, the shield electrode portion 363 is composed of only the shield electrode layer 363S including the extension portions 363SE.

Thus, the shield electrode layer 363S is maintained at the sensor ground potential SGND and provides an electromagnetic shield between the element heater wiring line 64 and the discharge electrode member 62. As a result, it is possible to prevent an induced current from flowing through the element heater wiring line 64, which flow would otherwise occur due to discharge at the discharge electrode member 62. Thus, changes in the chassis ground potential CGND, and resultant superimposition of noise on the output signal of the particulate sensor 310 can be suppressed.

Notably, in the particulate sensor 310 of the present second modification, as described above, the shield electrode layer 363S has the extension portions 363SE which are exposed from the side portions 360CSS and are not exposed from the first surface 360A of the discharge element 360 on which the discharge electrode pad 62P is provided. Since the distance between the discharge electrode member 362 to which high voltage is applied and the shield electrode portion 363 (the shield electrode layer 363S) maintained at the sensor ground potential SGND is larger than the distance between the discharge electrode member 62 and the shield electrode portion 63 in the discharge element 60 of the embodiment, the possibility of forming of a short circuit between the discharge electrode member 362 and the shield electrode portion 363 can be reduced.

In the particulate sensor 310 of the present second modification as well, the discharge element 360 is held gastightly by the electrically conductive seal 37 at the sealed portion 360C. In addition, electrical communication is established between the second inner tube 38 and the protector 31 by the electrically conductive seal 37. Therefore, a metal block, such as a metallic shell, is not needed for establishing electrical communication between the protector 31 and the first inner tube 39 or the second inner tube 38 so as to maintain the protector 31 at the sensor ground potential SGND. Therefore, the particulate sensor 310 can gastightly hold the discharge element 360 therein in spite of its simple structure.

Also, since the shield electrode layer 363S is maintained at the sensor ground potential SGND through the extension portions 363SE electrically communicating with the electrically conductive seal 37, wiring for supplying the sensor ground potential SGND to the shield electrode layer 363S of the discharge element 360 is not required in the particulate sensor 310.

In addition, in the discharge element 360 of the particulate sensor 310 of the present second modification, since the shield electrode layer 363S itself has the extension portions 363SE and is connected to the electrically conductive seal 37 through the extension portions 363SE, it is unnecessary to provide a via or the like inside the discharge element 360 for connection to the shield electrode layer 363S. Therefore, the shield electrode layer 363S can be connected to the electrically conductive seal 37 by a simple structure.

Third Modification

Next, a particulate sensor 410 according to a third modification will be described with reference to FIG. 12. The particulate sensor 410 of the present third modification is identical with the particulate sensor 310 of the second modification, except that the form of a discharge element 460 partially differs from the discharge element 360. Therefore, portions different from those of the particulate sensor 310 will be mainly described, and descriptions of portions identical with those of the particulate sensor 310 will be omitted or simplified. Also, only the portions differing from those of the particulate sensor 310 are denoted by different reference numerals, and the portions identical with those of the particulate sensor 310 are denoted by the same reference numerals.

Namely, in the discharge element 460 in the particulate sensor 410 of the present third modification, the bonding layer 465B located on the lower side of the shield electrode layer 363S has elongated recesses 465BC at positions corresponding to the extension portions 363SE. Further, the ceramic layer 461C located on the lower side of the bonding layer 465B has semicircular recesses 461CC at positions corresponding to the elongated recesses 465BC (in the present third modification, three positions on each side) (see FIG. 12C).

As in the case of the discharge element 360 of the present second modification, in the discharge element 460 of the present third modification, the extension portions 363SE of the shield electrode layer 363S are exposed from the side portions 460CSS, which is disposed between a first surface 460A and a second surface 460B of the outer surface 460CS, of the sealed portion 460C of the discharge element 460 (see FIG. 12B).

Therefore, the shield electrode layer 363S electrically communicates, at its extension portions 363SE, with the electrically conductive seal 37 which surrounds the outer surface 460CS of the sealed portion 460C of the discharge element 460 and is in gastight close contact with the outer surface 460CS, whereby the shield electrode layer 363S is directly maintained at the sensor ground potential SGND.

Accordingly, as in the case of the discharge element 360 of the second modification, it is unnecessary to provide a via or the like inside the discharge element 460 for connection to the shield electrode layer 363S. Therefore, the shield electrode layer 363S can be connected to the electrically conductive seal 37 by a simple structure.

In addition, unlike the discharge element 360 of the second modification, in the discharge element 460 of the present third modification, the bonding layer 465B and the ceramic layer 461C have the elongated recesses 465BC and the semicircular recesses 461CC, respectively, which are located below the extension portions 363SE of the shield electrode layer 363S. Therefore, at the side portions 460CSS of the discharge element 460, the extension portions 363SE of the shield electrode layer 363S are exposed to the outside through the elongated recesses 465BC and the semicircular recesses 461CC (see FIG. 12B).

Therefore, unlike the discharge element 360 of the second modification in which the shield electrode layer 363S is in contact with the electrically conductive seal 37 for electrical communication therewith only through the end surfaces of the extension portions 363SE of the shield electrode layer 363S, in the discharge element 460 of the present third modification, the shield electrode layer 363S is in contact with the electrically conductive seal 37 for electrical communication therewith not only through the end surfaces of the extension portions 363SE of the shield electrode layer 363S, but also through parts of the extension portions 363SE, which parts are exposed to the outside through the elongated recesses 465BC and the semicircular recesses 461CC. Thus, the extension portions 363SE of the shield electrode layer 363S can be more reliably brought into contact with the electrically conductive seal 37 for electrical communication therewith.

The present invention has been described on the basis of its embodiment and first through third modifications. However, the present invention is not limited to the above-described embodiment, etc., and can be implemented in an appropriately modified form without departing from the scope of the invention.

For example, in the embodiment, the shield electrode portion 63 (the shield electrode layer 63S, etc.) is provided in the discharge element 60 so as to provide an electromagnetic shield between the element heater wiring line 64 and the discharge electrode member 62. However, in the case where the level of noise generated is low, the shield electrode portion 63 (the shield electrode layer 63S, etc.) may be omitted from the discharge element 60.

Meanwhile, in the case where a more reliable electromagnetic shield must be provided between the element heater wiring line 64 and the discharge electrode member 62, a plurality of shield electrode layers 63S may be provided, or the discharge wiring trace 62L of the discharge electrode member 62 may be surrounded by a shield electrode layer.

In the first modification, the electrically conductive seal 237 is composed of the first electrically conductive seal 237A and the second electrically conductive seal 237B which are formed through use of electrically conductive glasses having different characteristics and are stacked in the axial direction GH. However, the electrically conductive seal 237 may be composed of three or more electrically conductive seal layers.

In the third modification, the ceramic layer 461C has three semicircular recesses 461CC on each side. However, the number of the recesses may be appropriately determined. For example, the ceramic layer 461C may have a single recess 461CC on each side or a proper number of recesses 461CC on each side. Also, the ceramic layer 461C may have recesses having a shape similar to that of the elongated recesses 465BC of the bonding layer 465B.

Alternatively, shield electrode pads may be provided on the side portions 360CSS or 460CSS of the discharge element 360 or 460 of the second or third modification at positions corresponding to the extension portions 363SE, whereby the extension portions 363SE more reliably come into contact with the electrically conductive seal 37 for electrical communication therewith.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application Nos. 2017-161218 filed Aug. 24, 2017 and 2017-187015 filed Sep. 27, 2017, the disclosures of which are incorporated herein by reference in their entirety.

What is claimed is:

1. A particulate sensor which is to be attached to a metallic gas flow pipe through which a gas to be measured containing particulates flows and which gas flow pipe is maintained at ground potential, the particulate sensor detecting the particulates contained in the gas to be measured, the particulate sensor comprising:

a gas introduction discharge pipe into which a gas under measurement, which is a portion of the gas to be measured, is introduced and from which the gas under measurement is then discharged;

a discharge element which is formed of insulating ceramic and includes a discharge electrode member maintained at a discharge potential different from the ground potential, the discharge element having an element distal end portion which is located on a distal end side of the discharge element, which element distal end portion is disposed in the gas introduction discharge pipe, and electrifies the particulates contained in the gas under measurement by means of discharge between the discharge electrode member and the gas introduction discharge pipe, and a sealed portion which is located on a proximal end side of the element distal end portion and in which the discharge electrode member is disposed and insulated from an outer surface thereof;

a surrounding member which is maintained at a first potential different from both the ground potential and the discharge potential and which surrounds an element proximal end side portion of the discharge element located on the proximal end side with respect to the sealed portion; and an electrically conductive seal which is formed of electrically conductive glass, establishes electrical communication between the surrounding member and the gas introduction discharge pipe, and is in close contact with the outer surface of the sealed portion of the discharge element so as to provide gastight sealing, wherein the electrically conductive glass is obtained by either (a) heating an insulating glass powder and an electrically conductive powder, or (b) heating an electrically conductive glass powder containing a metal-coated glass powder.

2. The particulate sensor as claimed in claim 1, wherein the discharge element includes an element heater wiring line which is connected at one end to the ground potential and which heats the element distal end portion, and a shield electrode layer which is disposed between the element heater wiring line and the discharge electrode member so as to electromagnetically shield the element heater wiring line and the discharge electrode member from each other; and
the shield electrode layer electrically communicates with the electrically conductive seal.

3. The particulate sensor as claimed in claim 2, wherein the discharge element has a shield electrode pad which is formed on the outer surface of the sealed portion and electrically communicates with the shield electrode layer; and
the shield electrode layer electrically communicates with the electrically conductive seal through the shield electrode pad.

4. The particulate sensor as claimed in claim 2, wherein the shield electrode layer has an extension portion extending to the outer surface of the discharge element; and
the shield electrode layer is connected to the electrically conductive seal at the extension portion.

5. The particulate sensor as claimed in claim 1, wherein the surrounding member includes an inner tube formed of metal and having the shape of a tube with a bottom, the inner tube having a closed distal end bottom portion on the distal end side and an insertion hole formed in the distal end bottom portion and through which the discharge element is inserted, the inner tube surrounding the element proximal end side portion of the discharge element from the radially outer side; and
the distal end bottom portion of the inner tube contacts the electrically conductive seal from the proximal end side.

6. The particulate sensor as claimed in claim 1, wherein the electrically conductive glass is obtained by heating the insulating glass powder and the electrically conductive powder.

7. The particulate sensor as claimed in claim 1, wherein the electrically conductive glass is obtained by heating the electrically conductive glass powder containing the metal-coated glass powder.

8. The particulate sensor as claimed in claim 1, wherein the electrically conductive seal directly contacts the sealed portion of the discharge element.

9. A particulate sensor which is to be attached to a metallic gas flow pipe through which a gas to be measured containing particulates flows and which gas flow pipe is maintained at ground potential, the particulate sensor detecting the particulates contained in the gas to be measured, the particulate sensor comprising:

a gas introduction discharge pipe into which a gas under measurement, which is a portion of the gas to be measured, is introduced and from which the gas under measurement is then discharged;

a discharge element which is formed of insulating ceramic and includes a discharge electrode member maintained at a discharge potential different from the ground potential, the discharge element having an element distal end portion which is located on a distal end side of the discharge element, which element distal end portion is disposed in the gas introduction discharge pipe, and electrifies the particulates contained in the gas under measurement by means of discharge between the discharge electrode member and the gas introduction discharge pipe, and a sealed portion which is located on a proximal end side of the element distal end portion and in which the discharge electrode member is disposed and insulated from an outer surface thereof;

a surrounding member which is maintained at a first potential different from both the ground potential and the discharge potential and which surrounds an element proximal end side portion of the discharge element located on the proximal end side with respect to the sealed portion; and an electrically conductive seal which is formed of electrically conductive glass, establishes electrical communication between the surrounding member and the gas introduction discharge pipe, and is in close contact with the outer surface of the sealed portion of the discharge element so as to provide gastight sealing;

a tubular insulating spacer which is formed of insulating ceramic and which is disposed radially outward of a distal end side portion of the surrounding member on the distal end side, the electrically conductive seal, and a pipe proximal end side portion which is a portion of the gas introduction discharge pipe on the proximal end side;

the electrically conductive seal is in gastight close contact with an inner circumferential surface of the insulating spacer; and the distal end side portion of the surrounding member and the pipe proximal end side portion of the gas introduction discharge pipe are fixed to the insulating spacer through the electrically conductive seal.

10. The particulate sensor as claimed in claim 9, wherein the insulating spacer has a stepped spacer ledge portion projecting radially inward;
the pipe proximal end side portion of the gas introduction discharge pipe has a stepped pipe shoulder portion whose diameter on the distal end side is smaller than that on the proximal end side and which engages the spacer ledge portion, and a pipe proximal end portion which is located on the proximal end side of the pipe shoulder portion and has an end edge on the proximal end side; and the electrically conductive seal is in contact with the pipe proximal end portion.

11. The particulate sensor as claimed in claim 10, further comprising an element holder which is formed of insulating ceramic and which has, on its outer circumferential surface, a stepped holder shoulder portion whose diameter on the distal end side is smaller than that on the proximal end side and which engages the pipe shoulder portion of the gas introduction discharge pipe, and an insertion hole through which an element insertion portion of the discharge element between the element distal end portion and the sealed portion is inserted, wherein the element holder holds the discharge element at the through hole, and butts against the electrically conductive seal from the distal end side.

12. A method of manufacturing a particulate sensor which is to be attached to a metallic gas flow pipe through which a gas to be measured containing particulates flows and which gas flow pipe is maintained at ground potential, the particulate sensor detecting the particulates contained in the gas to be measured, the particulate sensor comprising:

a gas introduction discharge pipe into which a gas under measurement, which is a portion of the gas to be measured, is introduced, and from which the gas under measurement is then discharged;

a discharge element which is formed of insulating ceramic and includes a discharge electrode member maintained at a discharge potential different from the ground potential, the discharge element having an element distal end portion which is located on a distal end side of the discharge element, is disposed in the gas introduction discharge pipe, and electrifies the particulates contained in the gas under measurement by means of discharge between the discharge electrode member and the gas introduction discharge pipe, and a sealed portion which is located on a proximal end side of the element distal end portion and in which the discharge electrode member is disposed and insulated from an outer surface thereof;

a surrounding member which is maintained at a first potential different from both the ground potential and the discharge potential and which surrounds an element proximal end side portion of the discharge element located on the proximal end side with respect to the sealed portion; and an electrically conductive seal which is formed of electrically conductive glass, establishes electrical communication between the surrounding member and the gas introduction discharge pipe, and is in close contact with the outer surface of the sealed portion of the discharge element so as to provide gastight sealing, wherein the method comprises a seal forming step of bringing softened electrically conductive glass into close contact with outer surfaces of the surrounding member, the gas introduction discharge pipe, and the sealed portion of the discharge element to thereby form the electrically conductive seal, and the electrically conductive glass is obtained by either (a) heating an insulating glass powder and an electrically conductive powder, or (b) heating an electrically conductive glass powder containing a metal-coated glass powder.

13. The method as claimed in claim 12, wherein
the electrically conductive glass is obtained by heating the insulating glass powder and the electrically conductive powder.

14. The method as claimed in claim 12, wherein
the electrically conductive glass is obtained by heating the electrically conductive glass powder containing the metal-coated glass powder.

15. The method as claimed in claim 12, wherein
the electrically conductive seal directly contacts the sealed portion of the discharge element.

* * * * *